US006954564B2

(12) United States Patent
Bendett

(10) Patent No.: US 6,954,564 B2

(45) Date of Patent: Oct. 11, 2005

(54) APPARATUS AND METHOD FOR INTEGRATED PHOTONIC DEVICES HAVING HIGH-PERFORMANCE WAVEGUIDES AND MULTICOMPOSITIONAL SUBSTRATES

(75) Inventor: Mark P. Bendett, Plymouth, MN (US)

(73) Assignee: Teem Photonics, Meylan (FR)

( * ) Notice: Subject to any disclaimer, the term of this patent is extended or adjusted under 35 U.S.C. 154(b) by 34 days.

(21) Appl. No.: 09/995,407

(22) Filed: Nov. 27, 2001

(65) Prior Publication Data

US 2002/0106150 A1 Aug. 8, 2002

Related U.S. Application Data

(60) Provisional application No. 60/253,200, filed on Nov. 27, 2000.

(51) Int. Cl.[7] .................................................. G02B 6/26

(52) U.S. Cl. ............................ 385/27; 385/14; 385/42; 385/50; 385/131; 385/132

(58) Field of Search ............................ 385/27, 39, 50, 385/42, 14, 129–132

(56) References Cited

U.S. PATENT DOCUMENTS

| | | | |
|---|---|---|---|
| 2,110,237 | A | 3/1938 | Parsons |
| 2,182,564 | A | 12/1939 | Leiboff |
| 3,481,712 | A | 12/1969 | Bernstein et al. |
| 3,733,179 | A | 5/1973 | Guehler |
| 3,880,630 | A | 4/1975 | Izawa |
| 3,888,648 | A | 6/1975 | West et al. |
| 3,912,363 | A | 10/1975 | Hammer |
| 4,039,249 | A | 8/1977 | Kaminow et al. |
| 4,318,058 | A | 3/1982 | Mito et al. |
| 4,335,079 | A | 6/1982 | Vander Mey |
| 4,515,431 | A | 5/1985 | Shaw et al. |
| 4,659,175 | A | 4/1987 | Wilde |
| 4,768,849 | A | 9/1988 | Hicks, Jr. |
| 4,983,197 | A | 1/1991 | Froning et al. |
| 4,986,624 | A | 1/1991 | Sorin et al. |

(Continued)

FOREIGN PATENT DOCUMENTS

| | | | |
|---|---|---|---|
| EP | 0784362 | 7/1997 | |
| EP | 0778478 | 9/1997 | |
| EP | 0938000 | 8/1999 | |
| EP | 0964290 | 12/1999 | |
| JP | 2222187 | 9/1990 | |
| JP | 02222187 | 9/1990 | ............. H01S/3/23 |
| JP | 05002155 | 1/1993 | |
| JP | 60-158407 | 8/1995 | |
| WO | WO-97/44686 | 11/1997 | |

OTHER PUBLICATIONS

"TIA/EIA Telecommunications Systems Bulletin", *APCO Project 25 System and Standards Definition, TSB102–A (Revsion of TSB102),* (1995).

(Continued)

*Primary Examiner*—Fayez G. Assaf

(74) *Attorney, Agent, or Firm*—Schwegman, Lundberg, Woessner & Kluth, P.A.

(57) ABSTRACT

An integrated photonic apparatus that includes a glass substrate having a major surface, wherein the glass substrate includes a plurality of regions, each region having a different index of refraction, including a first region having a first index of refraction and a second region having a second index of refraction lower than the first index of refraction, and a first waveguide formed along the major surface of the substrate, wherein the first waveguide has a higher index of refraction than an intrinsic index of refraction of adjacent portions of the substrate, and wherein the first waveguide passes through the first region and through the second region of the glass substrate.

34 Claims, 25 Drawing Sheets

U.S. PATENT DOCUMENTS

| | | | | |
|---|---|---|---|---|
| 4,993,034 | A | 2/1991 | Aoki et al. | |
| 5,080,503 | A | 1/1992 | Najafi et al. | |
| 5,081,314 | A | 1/1992 | Kissel et al. | |
| 5,134,620 | A | 7/1992 | Huber | |
| 5,142,660 | A | 8/1992 | Chang et al. | |
| 5,151,908 | A | 9/1992 | Huber | |
| 5,242,531 | A | 9/1993 | Klingshirn et al. | |
| 5,243,609 | A | 9/1993 | Huber | |
| 5,271,024 | A | 12/1993 | Huber | |
| 5,295,209 | A | 3/1994 | Huber | |
| 5,311,540 | A | 5/1994 | Pocholle et al. | |
| 5,334,559 | A | 8/1994 | Hayden | |
| 5,381,262 | A | 1/1995 | Arima et al. | |
| 5,384,797 | A | 1/1995 | Welch et al. | |
| 5,436,919 | A | 7/1995 | Chwalek et al. | 372/7 |
| 5,473,722 | A | 12/1995 | Sohler et al. | |
| 5,491,708 | A | 2/1996 | Malone et al. | |
| 5,513,196 | A | 4/1996 | Bischel et al. | 372/22 |
| 5,526,371 | A | 6/1996 | Shmulovich et al. | |
| 5,544,268 | A | 8/1996 | Bischel et al. | |
| 5,574,807 | A | 11/1996 | Snitzer | |
| 5,579,154 | A | 11/1996 | Mueller-Fiedler et al. | |
| 5,580,471 | A | 12/1996 | Fukumoto et al. | |
| 5,614,436 | A | 3/1997 | Shim et al. | |
| 5,623,567 | A | 4/1997 | Barberio et al. | |
| 5,625,728 | A | 4/1997 | Tardy et al. | |
| 5,660,611 | A | 8/1997 | Ishikawa et al. | |
| 5,677,769 | A | 10/1997 | Bendett | |
| 5,677,920 | A | 10/1997 | Waarts et al. | |
| 5,684,899 | A | 11/1997 | Ota | |
| 5,703,980 | A | 12/1997 | MacElwee et al. | |
| 5,805,755 | A | 9/1998 | Amersfoort et al. | |
| 5,887,097 | A | 3/1999 | Henry et al. | 385/39 |
| 5,915,051 | A | 6/1999 | Damask et al. | |
| 5,953,359 | A | 9/1999 | Yamaguchi et al. | |
| 6,055,342 | A | 4/2000 | Yi et al. | 385/15 |
| H1848 | H | 5/2000 | Amin et al. | 385/132 |
| 6,101,210 | A | 8/2000 | Bestwick et al. | |
| 6,144,785 | A | 11/2000 | Fujita | |
| 6,211,980 | B1 | 4/2001 | Terahara | 359/128 |
| 6,304,697 | B1 | 10/2001 | Toyohara | |
| 6,304,711 | B1 | 10/2001 | Samson et al. | |
| 6,330,388 | B1 | 12/2001 | Bendett et al. | |
| 6,434,294 | B1 | 8/2002 | Gallo | |
| 6,625,349 | B2 | 9/2003 | Zhao et al. | |
| 6,636,678 | B1 | 10/2003 | Bendett et al. | |
| 6,690,857 | B2 | 2/2004 | Zhao et al. | |
| 6,813,405 | B1 | 11/2004 | Bendett et al. | |
| 6,858,051 | B2 | 2/2005 | Uhlenbrock | |
| 2002/0028390 | A1 | 3/2002 | Mazed | |
| 2002/0089711 | A1 | 7/2002 | Conzone et al. | |

OTHER PUBLICATIONS

Barbier, D., et al., "Sub–Centimeter Length Ion–Exchanged Waveguide Lasers In Er/Yb Doped Phosphate Glass", *11th Ann. Conf. on Integrated Optics and Optical Fibre Comm.,* vol. 4, (1997), pp. 41–44.

Roman, J.E., et al., "Neodymium–Doped Glass Channel Waveguide Laser Containing an Integrated Distributed Bragg Reflector", *Applied Physics Letters,* 61 (23), Amer. Inst. of Physics, (Dec. 7, 1992), pp. 2744–2746.

Veasey, D.L., et al., "Arrays of Distributed–Bragg–Reflector Waveguide Lasers at 1536 nm in Yh/Er Codoped phosphate glass", *Applied Physics Letters, 74 (6),* Amer. Inst. of Physics, NY, (Feb. 8, 1999), pp. 789–791.

Veasey, D.L., et al., "Distributed Feedback Lasers in Rare–Earth–Doped phosphate glass", *(Abstract) Proceedings of the 7th European Conference on Integrated Optics with Technical Exhibition, vol. 1, XP00097817,* Delft, Netherlands, (Apr. 3–6, 1995), pp. 579–582.

APPARATUS AND METHOD FOR INTEGRATED PHOTONIC DEVICES HAVING HIGH-PERFORMANCE WAVEGUIDES AND MULTICOMPOSITIONAL SUBSTRATES

RELATED APPLICATIONS

This application claims the benefit under 35 U.S.C. 119(e) of U.S. Provisional Application Ser. No. 60/253,200 filed Nov. 27, 2000, which is incorporated in its entirety by reference.

This application is also related to: U.S. patent application Ser. No. 09/995,346, entitled APPARATUS AND METHOD FOR INTEGRATED PHOTONIC DEVICES HAVING WAVELENGTH-SHAPING GRATINGS filed on even date herewith, and U.S. patent application Ser. No. 09/995,404, entitled APPARATUS AND METHOD FOR INTEGRATED PHOTONIC DEVICES HAVING ADD/DROP PORTS AND GAIN filed on even date herewith, and U.S. patent application Ser. No. 09/995,406, entitled APPARATUS AND METHOD FOR INTEGRATED PHOTONIC DEVICES HAVING ADJUSTABLE GAIN filed on even date herewith, and U.S. patent application Ser. No. 09/490,748, entitled RARE-EARTH DOPED PHOSPHATE-GLASS LASERS AND ASSOCIATED METHODS filed on Jan. 25, 2000 and U.S. patent application Ser. No. 09/490,733, entitled METHOD AND APPARATUS FOR CLOSED-CRUCIBLE PROCESSING OF WAVEGUIDE OPTICS filed on Jan. 25, 2000 and U.S. patent application Ser. No. 09/490,730, entitled METHOD AND APPARATUS FOR WAVEGUIDE OPTICS AND DEVICES filed on Jan. 25, 2000, each of which are incorporated in their entirety by reference.

FIELD OF THE INVENTION

This invention relates to the field of optics and lasers, and more specifically to a method and apparatus including multi-compositional glass substrates and related devices and optical waveguides on a glass substrate.

BACKGROUND OF THE INVENTION

The telecommunications industry commonly uses optical fibers to transmit large amounts of data in a short time. One common light source for optical-fiber communications systems is a laser formed using erbium-doped glass. One such system uses erbium-doped glass fibers to form a laser that emits at a wavelength of about 1.536 micrometer and is pumped by an infrared source operating at a wavelength of about 0.98 micrometer. One method usable for forming waveguides in a substrate is described in U.S. Pat. No. 5,080,503 issued Jan. 14, 1992 to Najafi et al., which is hereby incorporated by reference. A phosphate glass useful in lasers is described in U.S. Pat. No. 5,334,559 issued Aug. 2, 1994 to Joseph S. Hayden, which is also hereby incorporated by reference. An integrated optic laser is described in U.S. Pat. No. 5,491,708 issued Feb. 13, 1996 to Malone et al., which is also hereby incorporated by reference.

To increase signal-carrying bandwidth, an optical fiber can carry a plurality of different wavelengths (i.e., colors), wherein each wavelength is modulated (e.g., using amplitude modulation) with a different signal stream. Dense wavelength-division multiplexing (DWDM) is the name for one such scheme wherein each signal stream is modulated on a carrier wavelength that is close to, but slightly different than, the neighboring wavelengths. For example, the carrier wavelengths can be chosen in the infrared at, say, 1536 nm, 1536.8 nm, 1537.6 nm, etc., for a wavelength spacing of 0.8 nm per channel. Many such wavelengths/channels can be combined and transmitted on a single optical fiber. Since photons have extraordinarily low or no interaction with one another, these channels are transmitted with no crosstalk or other interchannel interference. Further, a broadband light amplifier can be used to simultaneously amplify all the colors/channels by equal amounts, also without introducing crosstalk. The challenge, thus, is to be able to separate the channels (i.e., to split off each channel's color without also getting interfering light signals from adjacent channels' colors).

It is desirable to be able, at, for example, a building in downtown Minneapolis, to extract one channel from the plurality of optical channels of data carried on a single optical fiber, e.g., to extract a first data stream that is modulated on the 1536.8 nm channel from all the other channels on some single optical fiber, and to insert in its place a second data stream that is modulated on the 1536.8 nm channel. The remaining channels being transmitted on the optical fiber should be undisturbed. This allows data that has a destination in that building to be separated and delivered into that building, and for other data in the second data stream to be sourced from that building and sent elsewhere.

There is a need in the art for an integrated optical system, including one or more high-powered lasers along with routing and other components, that can be inexpensively mass-produced. The system should be highly reproducible, accurate, and stable. There is further a need to having improved delivery of pump light to the active waveguides. There is further a need for improved add-drop devices that permit extraction of a first signal stream at a first wavelength from a plurality of other signal wavelengths, and insertion of a second signal stream modulated onto a laser carrier of the first wavelength.

SUMMARY OF THE INVENTION

The present invention is embodied by a laser, amplifier, other optical or combined component that includes a glass substrate, in some or all portions possibly doped with one or more optically active lanthanide species, and having a plurality of waveguides defined by channels within the substrate.

One aspect of the present invention provides an integrated photonic apparatus that includes a multicompositional glass substrate having a major surface, wherein the glass substrate includes a plurality of regions, each region having a different index of refraction, including a first region having a first index of refraction and a second region having a second index of refraction lower than the first index of refraction, and a first waveguide formed along the major surface of the substrate, wherein the first waveguide has a higher index of refraction than an intrinsic index of refraction of adjacent portions of the substrate, and wherein the first waveguide passes through the first region and through the second region of the glass substrate.

In some embodiments, the first region includes a dopant including an optically active species, wherein the first region acts to substantially confine a pump light. In some embodiments, the higher index of refraction of the first region allows pump light to enter the first region but not escape to the second region.

Another aspect of the present invention provides an integrated photonic apparatus that includes a glass substrate having a major surface, wherein the glass substrate includes a plurality of regions, each region having a different index of refraction, including a first region having a first index of refraction and a second region having a second index of refraction lower than the first index of refraction, the first region forming a first waveguide for constraining a pump light, and a second waveguide formed along the major surface of the substrate, wherein the second waveguide has a higher index of refraction than an intrinsic index of refraction of adjacent portions of the substrate, and wherein the second waveguide passes through the first region and through the second region of the glass substrate, and wherein the pump light enters the second waveguide along its side in the first waveguide.

Another aspect of the present invention provides apparatus and methods for stabilizing and/or flattening gain curves. For example, a tuned grating to stabilize the input pump laser light, to flatten output gain curve, or both.

One embodiment includes an integrated photonic apparatus that has a glass substrate having a major surface, an input signal waveguide formed along the major surface of the substrate, wherein the input signal waveguide has a higher index of refraction than an index of refraction of adjacent portions of the substrate, an input pump waveguide formed along the major surface of the substrate, wherein the pump waveguide has a higher index of refraction than an index of refraction of adjacent portions of the substrate, an output pump waveguide, optically coupled to the input signal waveguide and to the pump waveguide, and formed along the major surface of the substrate, wherein the pump waveguide has a higher index of refraction than an index of refraction of adjacent portions of the substrate, and a first pump-stabilizing grating formed on the pump waveguide, wherein the first grating is transparent a first wavelength and is dispersive to a plurality of other wavelengths, such that the first wavelength is passed to the output waveguide and the plurality of other wavelengths are attenuated.

Yet another aspect of the present invention provides an integrated photonic apparatus including a glass substrate having a major surface, the substrate including at least a portion having one or more active optical species, an input signal waveguide formed along the major surface of the substrate, wherein the input signal waveguide has a higher index of refraction than an index of refraction of adjacent portions of the substrate, an input pump waveguide formed along the major surface of the substrate, wherein the pump waveguide has a higher index of refraction than an index of refraction of adjacent portions of the substrate, an output pump waveguide, optically coupled to the input signal waveguide and to the pump waveguide, and formed along the major surface of the substrate, wherein the pump waveguide has a higher index of refraction than an index of refraction of adjacent portions of the substrate, and a first output-flattening grating formed on the output waveguide, wherein the first output-flattening grating has a wavelength-transfer function that is complementary to a gain curve of the active species of the substrate in order to flatten a gain curve of the apparatus.

The present invention also provides apparatus and methods for adding and/or dropping one or more optical wavelengths from a light signal having a plurality of wavelengths. For example, selectable gratings to get a tunable/selectable drop (peel-off) wavelength, an add waveguide that is run in an undoped region running parallel to the active drop section, and/or an add/drop peel-off section surrounded with a confined active region. Some embodiments selectively pump waveguides in a lossy gain region to activate add/drop attenuation/amplification functions, such that specific waveguides are activated. In some such embodiments, this is combined with an undoped region fused to active region, wherein pump light is launched into undoped waveguides that route activation light to selected doped waveguides.

Some embodiments include an integrated photonic apparatus that has a glass substrate having a major surface, an input signal waveguide formed along the major surface of the substrate, wherein the input waveguide has a higher index of refraction than an index of refraction of adjacent portions of the substrate, an output signal waveguide, optically coupled to the input waveguide, and formed along the major surface of the substrate, wherein the output waveguide has a higher index of refraction than an index of refraction of adjacent portions of the substrate, a drop signal waveguide, optically coupled to the input waveguide, and formed along the major surface of the substrate, wherein the drop waveguide has a higher index of refraction than an index of refraction of adjacent portions of the substrate, and a first grating formed on the output waveguide, wherein the first grating reflects a first wavelength and is transparent to a plurality of other wavelengths, such that the first wavelength is passed to the drop waveguide and the plurality of other wavelengths is passed through to an exit interface of the output waveguide.

Some such embodiments further include a second grating formed on the output waveguide, wherein the first and second gratings are electrically activatable, and wherein the first grating when activated reflects a first wavelength and is transparent to a plurality of other wavelengths including a second wavelength, wherein the second grating when activated reflects the second wavelength and is transparent to a plurality of other wavelengths including the first wavelength, such that when the first grating is activated and the second grating is deactivated the first wavelength is passed to the drop waveguide and the second wavelength is passed through to the exit interface of the output waveguide, and when the second grating is activated and the first grating is deactivated the second wavelength is passed to the drop waveguide and the first wavelength is passed through to the exit interface of the output waveguide.

Some embodiments further include an add signal waveguide, optically coupled to the output waveguide, and formed along the major surface of the substrate, wherein the add waveguide has a higher index of refraction than an index of refraction of adjacent portions of the substrate, and wherein the first grating reflects a first wavelength and is transparent to a plurality of other wavelengths, wherein a third wavelength is launched into the add waveguide, such that the first wavelength is passed to the drop waveguide and the plurality of other wavelengths and the third wavelength are passed through to an exit interface of the output waveguide.

Some embodiments further include an add signal waveguide, optically coupled to the output waveguide, and formed along the major surface of the substrate, wherein the add waveguide has a higher index of refraction than an index of refraction of adjacent portions of the substrate, and wherein the first grating reflects a first wavelength and is transparent to a plurality of other wavelengths, wherein a third wavelength is launched into the add waveguide, such that the first wavelength is passed to the drop waveguide and the plurality of other wavelengths and the third wavelength are passed through to an exit interface of the output waveguide.

DESCRIPTION OF PREFERRED EMBODIMENTS

Figure 1:
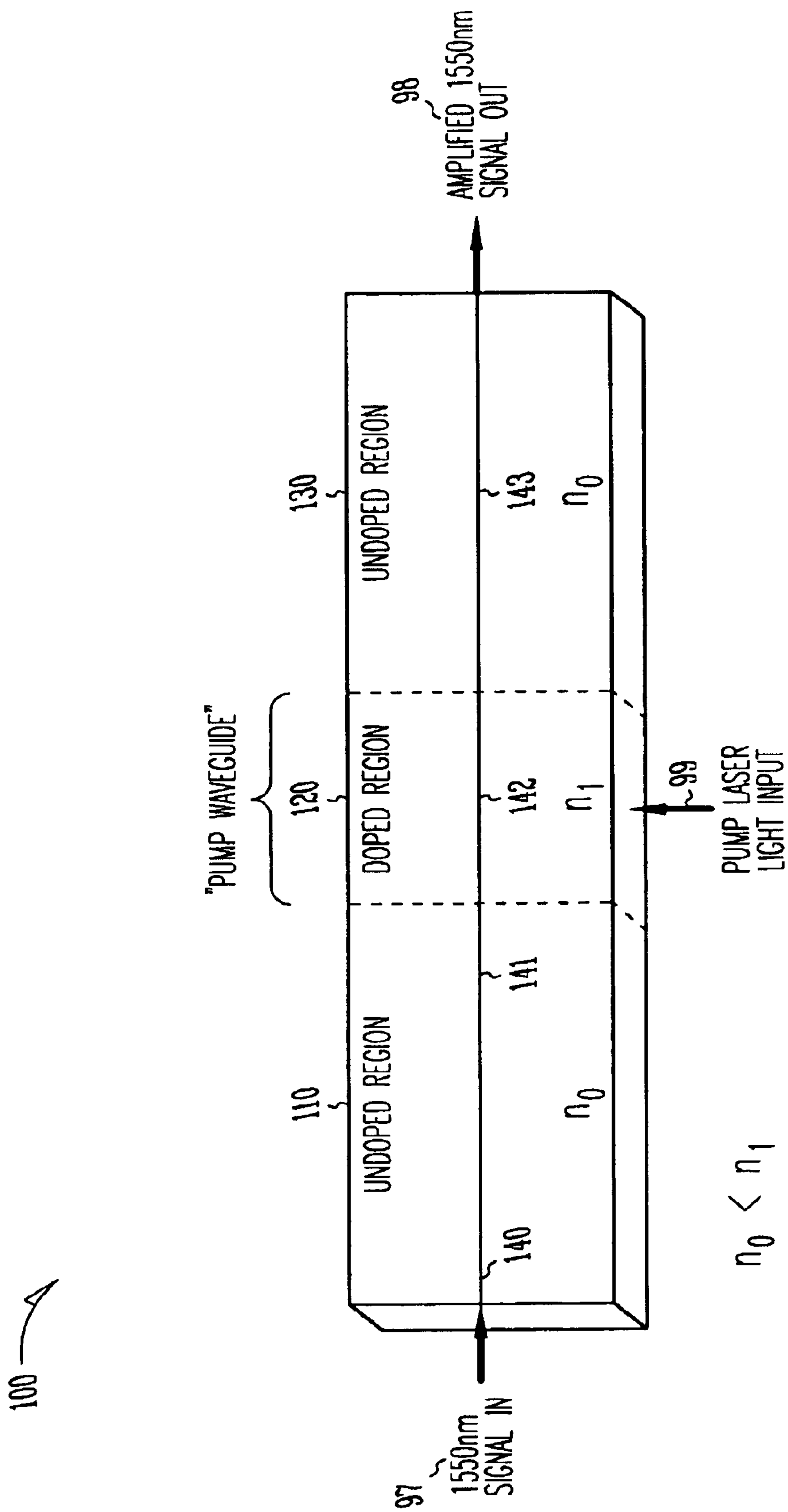
FIG. 1 shows a top isometric view of a waveguide device 100 having a signal waveguide passing left to right, and a doped region forming a pump waveguide passing bottom to top.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The present invention provides a process for forming waveguides onto (or into) the surface of a glass substrate. In one embodiment, photolithographic techniques define waveguides by changing the index of refraction of waveguide channels formed into the surface of the substrate. In one such embodiment, a glass wafer, for example approximately 10 cm by 10 cm by 1 mm, is cut from a slab of IOG-1 laser glass available from Schott Glass Technologies, Inc., of Duryea, Pa., USA. The surfaces of interest, including a "top" major surface (where "top" refers to an orientation in the Figures of this discussion, and not necessarily to an orientation used in the process or operation of the devices) are polished to optical smoothness.

In some embodiments, a phosphate glass composition called IOG1 glass available from Schott Glass Technologies, Inc. is used, and molten potassium salt ion-exchange is used to form the waveguides. In some such embodiments, these waveguides are formed as described in the above mentioned U.S. patent application Ser. No. 09/490,730. In other embodiments, a silver salt ion-exchange is used instead to form the waveguides, in order to make smaller-diameter waveguides. In some embodiments, for example, the doped glass is IOG1 glass that has an Erbium concentration of about 1.5 times $10^{20}$ ions/cc and a Ytterbium concentration of about 6 to 8 times $10^{20}$ ions/cc, and the undoped glass is IOG1 glass that has little or no Erbium or Ytterbium. In various other embodiments, the dopant combinations are Erbium about 1 times $10^{20}$ ions/cc and Ytterbium about 4 times $10^{20}$ ions/cc, Erbium about 1.5 times $10^{20}$ ions/cc and Ytterbium about 4 times $10^{20}$ ions/cc, Erbium about 1 times $10^{20}$ ions/cc and Ytterbium about 6 times $10^{\circ}$ions/cc, Erbium about 1.25 times $10^{20}$ ions/cc and Ytterbium about 6 times $10^{20}$ ions/cc, or Erbium about 1.5 times $10^{20}$ ions/cc and Ytterbium about 6 times $10^{20}$ ions/cc. In some embodiments, shorter devices include doping with a higher a Ytterbium concentration, in order to have the pump light absorbed within the device rather than exiting the device as waste light.

The present invention is embodied by a laser component that includes a glass substrate doped with one or more optically active lanthanide species, or a laser species that is not a lanthanide, and having a plurality of waveguides defined by channels within the substrate.

As used herein, a "channel within the substrate" is meant to broadly include any channel that guides light and is formed on or in the substrate, whether or not covered by another structure or layer of substrate. As used herein, when an embodiment reciting optically active lanthanide species is described, other embodiments may use a laser species that is not a lanthanide.

Each substrate waveguide (or "channel") is defined within the substrate as a region of increased index of refraction relative to the substrate. The glass substrate is doped with one or more optically active lanthanide species which can be optically pumped (typically a rare-earth element such as Er, Yb, Nd, or Pr or a combination of such elements such as Er and Yb) to form a laser medium which is capable of lasing at a plurality of frequencies. Mirrors or distributed Bragg reflection gratings may be located along the length of a waveguide for providing feedback to create a laser-resonator cavity. One or more of the mirrors or reflection gratings is made partially reflective for providing laser output.

The laser component may constitute a monolithic array of individual waveguides in which the waveguides of the array form laser resonator cavities with differing resonance characteristics (e.g., each cavity resonating at one of a plurality of differing wavelengths). The component may thus be used as part of a laser system outputting laser light at a plurality of selected wavelengths. In certain embodiments of the invention, the resonance characteristics of a waveguide cavity are varied by adjusting the width of the channel formed in the substrate which thereby changes the effective refractive index of the waveguide, thus changing the effective optical spacing of the grating. The effective refractive index can also be changed by modifying the diffusion conditions under which the waveguides are formed as described below. Changing the effective refractive index thus changes the effective DBR spacings length of the waveguide cavity which in some embodiments determines the wavelengths of the longitudinal modes supported by the cavity. In another embodiment, the resonance characteristics of the waveguide cavities are individually selected by varying the pitch of the reflection gratings used to define the cavities which, along with the effective refractive index of the waveguide under the DBR for the propagated optical mode, determines the wavelengths of light reflected by the gratings. In still other embodiments, the location of the reflectors on the waveguide is varied in order to select a laser-resonator cavity length that supports the desired wavelength of light.

One embodiment of the invention is illustrated by FIG. 1, which shows a top isometric view of a waveguide device 100 having a signal waveguide 140 passing left to right, and a doped region 120 forming a pump waveguide passing bottom to top, between undoped region 110 and undoped region 130 which are fused together as a multicompositional glass substrate. Doped region 120 has an index of refraction n1 that is higher than the index of refraction n0 of undoped region 110 and undoped region 130. Signal waveguide 140 has an index of refraction nw1 that is higher than index of refraction n1 when it is in region 120, and has an index of refraction nw0 that is higher than index of refraction n0 when it is in region 110 and region 130. In some embodiments, the signal waveguide 140 has a uniform index of refraction (nw1=nw0) to minimize reflections of the signal 97 entering waveguide 140 at the left, passing left to right and amplified signal 98 exiting the right. In some embodiments, undoped region 110 and undoped region 130 have indices of refraction n0 and n0' respectively that are different from one another, but both are lower than the index of refraction n1 of region 120. Because index of refraction n1 is higher than the surrounding regions, pump light entering region 120 will tend to stay in that region instead of leaking to undoped region 110 and undoped region 130. By having such a large cross-sectional area (i.e., all of region 120), the pump light 99 is easily launched into that region, and that entire region forms a "waveguide" that confines the pump light and allows more of the pump light a chance to enter the active portion 142 of the signal waveguide 140. The widths of the undoped regions 110 and 130 can be adjusted to accommodate other desired features of the device 100, some examples of which are described below.

Figure 2:
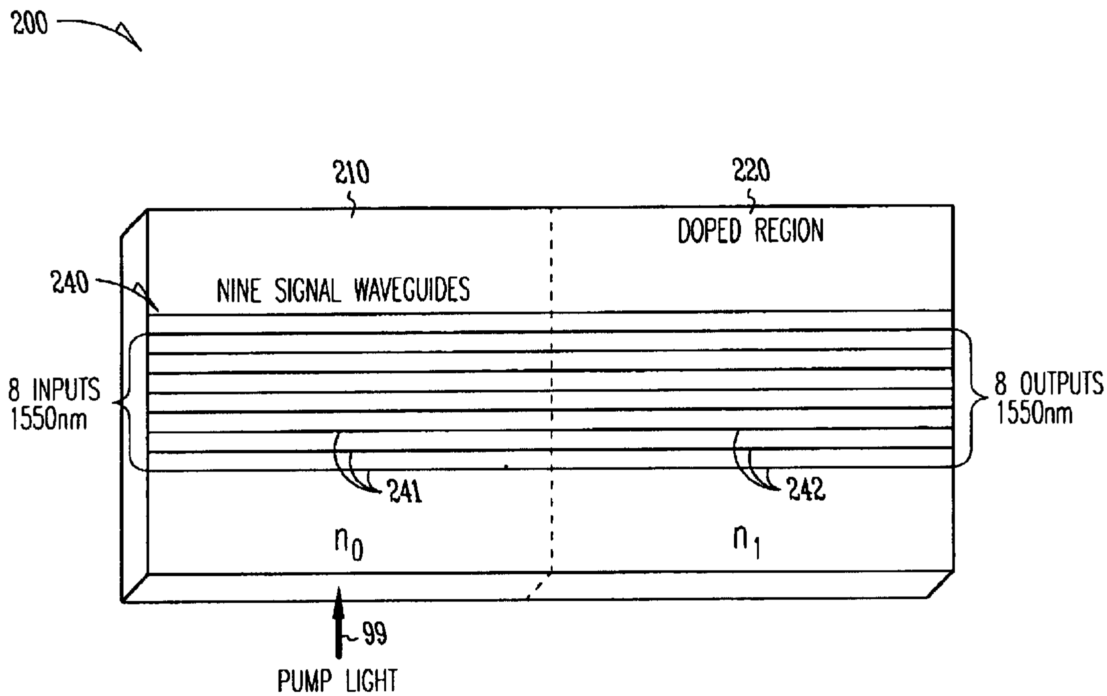
FIG. 2 shows a top isometric view of a waveguide device 200 having a plurality of signal waveguides passing left to right, and an undoped region n0 forming a pump (lossy) waveguide of lower index of refraction passing bottom to top and a single doped active region to the right.

One embodiment of the invention is illustrated by FIG. 2, which shows a top isometric view of a waveguide device 200 having a plurality of signal waveguides 240 passing left to right, and an undoped region 210 having an index of refraction n0, and forming a pump light (lossy) launch region of lower index of refraction passing bottom to top and a single doped active region 220 having an index of refraction n1 to the right of the Figure, where n1 is larger than n0. This allows pump light 99 to be launched into undoped region 210 and leak into the doped region 220, where it then enters the active portions 242 of each of the waveguides 240. Signal waveguides 240 have an index of refraction nw1 that is higher than index of refraction n1 when they are in region 220, and have an index of refraction nw0 that is higher than index of refraction n0 when they are in region 210. In some embodiments, the signal waveguides 240 have a uniform index of refraction (nw1=nw0) to minimize reflections of the signal passing left to right.

Figure 3:
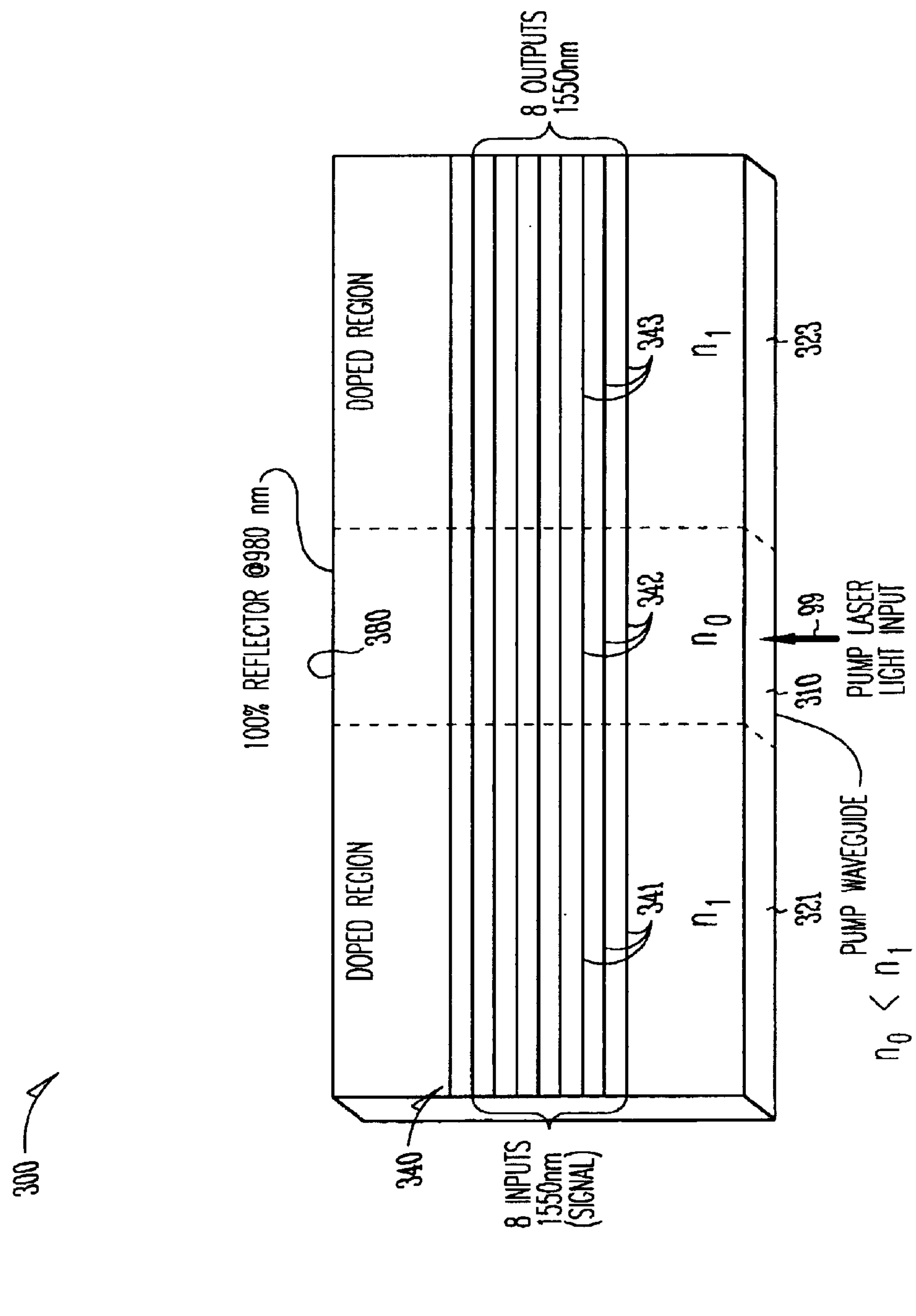
FIG. 3 shows a top isometric view of a waveguide device 300 having a plurality of signal waveguides passing left to right, and an undoped region n0 forming a pump (lossy) waveguide of lower index of refraction passing bottom to top and two doped active regions, one to the left and one to the right.

One embodiment of the invention is illustrated by FIG. 3, which shows a top isometric view of a waveguide device 300 having a plurality of signal waveguides 340 passing left to right, and an undoped region 310 located centrally and having index of refraction n0 forming a pump (lossy) waveguide of lower index of refraction passing bottom to top and two doped active regions 321 and 323, one to the left and one to the right, and each having a higher index of refraction (e.g., both n1, or each having a different index, n1 and n1' respectively, not equal to one another). This allows pump light 99 to be launched into undoped region 310 and leak into the doped regions 321 and 323, where it then enters the active portions 341 and 343 of each of the waveguides 240. Signal waveguides 340 have an index of refraction nw1 that is higher than index of refraction n1 when they are in region 321 and 323, and have an index of refraction nw0 that is higher than index of refraction n0 when they are in region 310. In some embodiments, the signal waveguides 340 have a uniform index of refraction (nw1=nw0) across their lengths to minimize reflections of the signal passing left to right.

Figure 4:
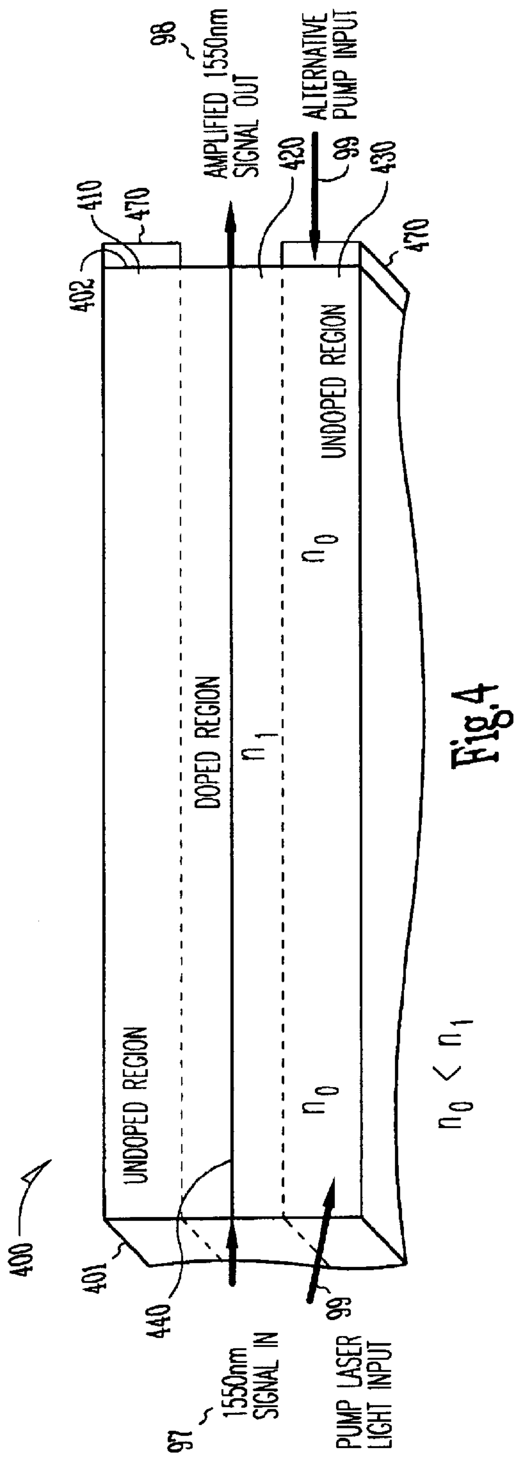
FIG. 4 shows a top isometric view of a waveguide device 400 having a signal waveguide passing left to right longitudinally within a doped region and centered, and an undoped region n0 forming a pump (lossy) waveguide of lower index of refraction passing along both sides of the active region, one above and one below.

One embodiment of the invention is illustrated by FIG. 4, which shows a top isometric view of a waveguide device 400 having a signal waveguide 440 passing left to right longitudinally within a doped region 420 and centered, and an undoped region(s) 410 and/or 430, each having an index of refraction n0 forming a pump (lossy) waveguide of lower index of refraction passing along both sides of the active region 420, one above and/or one below. Because the pump light of this embodiment is launched into an undoped region, there is little absorption of the pump light in regions 410 and 430, and the pump light is evenly distributed along the entire length of doped region 420. Because region 420 has a higher index of refraction, pump light enters doped region 420 but does not exit. Because waveguide 440 has an even higher index of refraction, pump light then enters waveguide 440 but does not exit. This provides highly efficient pump light launching from the exterior into region 410 and 430, and then into region 420 and then into waveguide 440. In some embodiments, the pump light 99 is launched directly into the same end face 401 into which the signal 441 is launched. In other embodiments, the pump light 99 is launched directly into an end face 402 opposite the face 401 into which the signal 441 is launched. In some embodiments, a reflective surface 470 is placed the face 402 opposite the face 401 into which pump light 99 is launched, in order to maximize pump light containment in the device 400.

Figure 5:
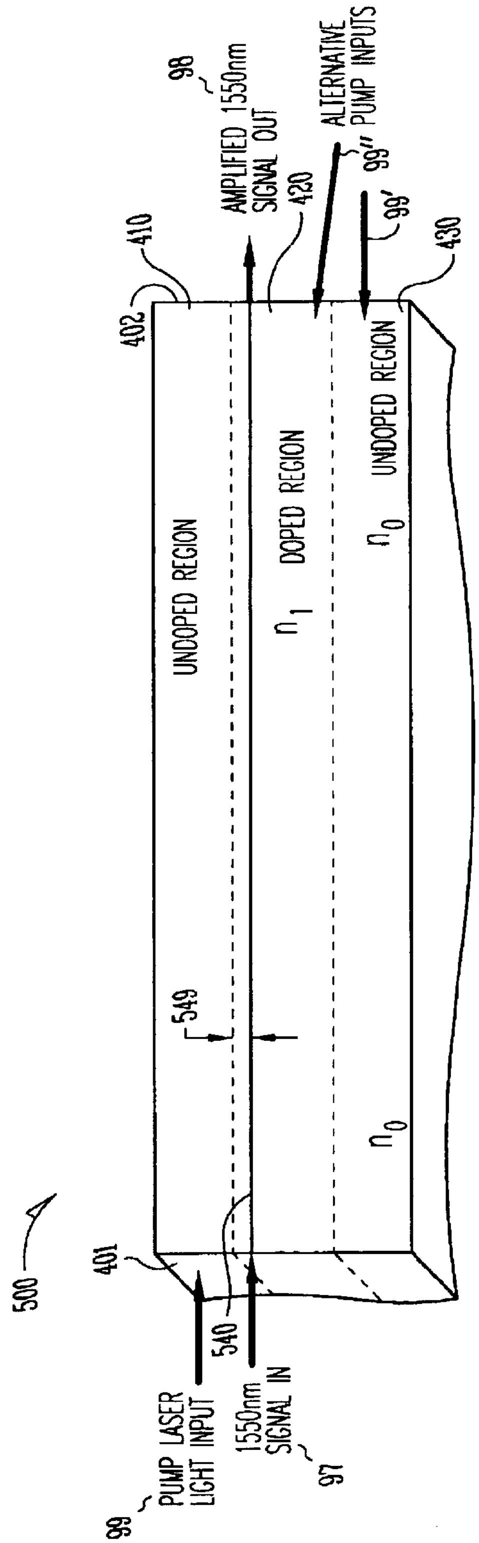
FIG. 5 shows a top isometric view of a waveguide device 500 having a signal waveguide passing left to right longitudinally within a doped region and off to the upper side to be a shorted distance from the pumped light, and an undoped region n0 forming a pump (lossy) waveguide of lower index of refraction passing along both sides of the active region, one above and one below.

One embodiment of the invention is illustrated by FIG. 5, which shows a top isometric view of a waveguide device 500 having a signal waveguide 540 passing left to right longitudinally within a doped region and offset to the upper side to be a shorter distance 549 from the pumped light in region 410, and an undoped region 410 having index of refraction n0 forming a pump (lossy) waveguide of lower index of refraction. This embodiment is otherwise the same as that of FIG. 4 above. In other embodiments, the pump light 99' is launched into the undoped region 430 from face 402 opposite to face 401 into which the signal 97 is launched. In still other embodiments, the pump light 99" is launched into the doped region 420 from face 402 opposite to face 401 into which the signal 97 is launched.

Figure 6:
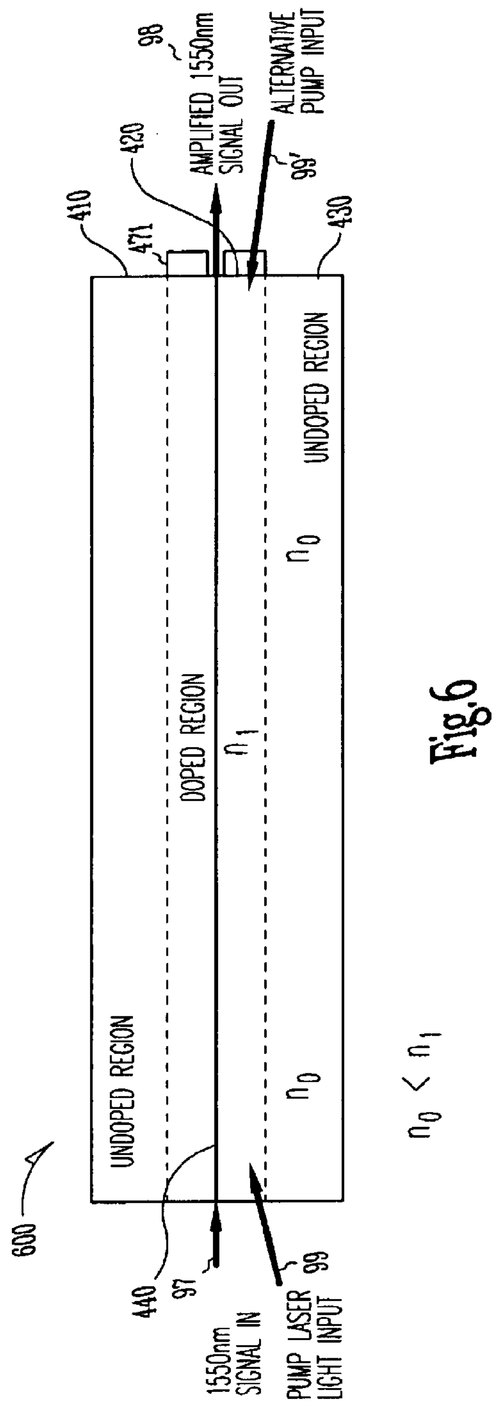
FIG. 6 shows a top isometric view of a waveguide device 600 having a signal waveguide passing left to right longitudinally within a doped region and centered, and an undoped region n0 along both sides of the active region, one above and one below, with pump light entering the end of the doped region.

One embodiment of the invention is illustrated by FIG. 6, which shows a top isometric view of a waveguide device 600 having a signal waveguide 440 passing left to right longitudinally within a doped region 420 and centered top-to-bottom therein, and an undoped region 410 and 430 having index of refraction n0 along both sides of the active region, one above and one below, with pump light 99 entering the end of the doped region 420 at face 401. In some embodiments, a reflective surface 471 is placed the face 402 opposite the face 401 into which pump light 99 is launched, in order to maximize pump light containment in the doped region 420. This device 600 is otherwise the same as for FIG. 4 described above.

Figure 7:
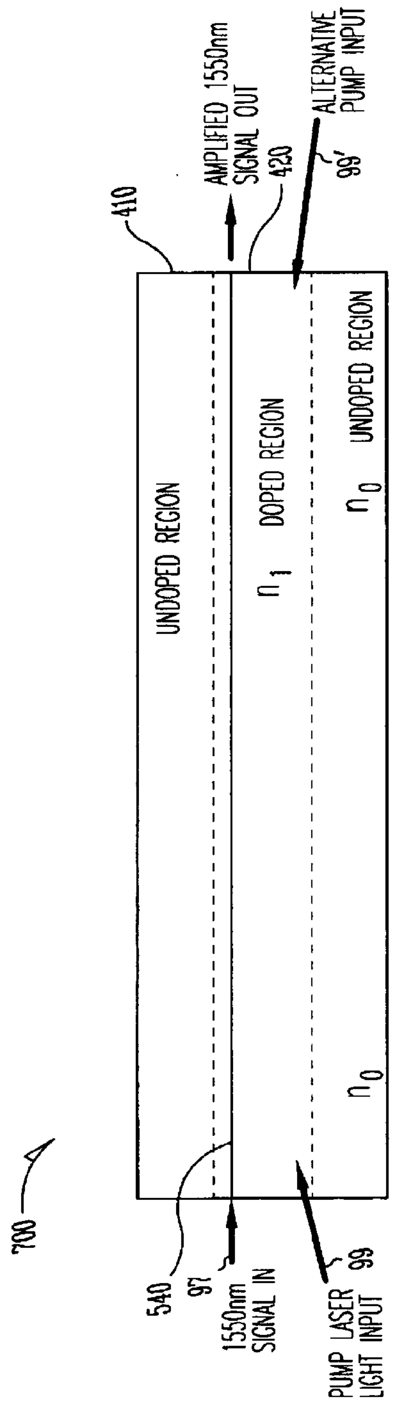
FIG. 7 shows a top isometric view of a waveguide device 700 having a signal waveguide passing left to right longitudinally within a doped region and off to the upper side to be a shorted distance from the pumped light, and an undoped region n0 along both sides of the active region, one above and one below, with pump light entering the-end of the doped region also.

One embodiment of the invention is illustrated by FIG. 7, which shows a top isometric view of a waveguide device 700 having a signal waveguide passing left to right longitudinally within a doped region and offset towards one edge of the doped region (the upper side, in the figure) to be a shorter distance from the pumped light, which is launched transversely from the top edge of the undoped glass region 410. Device 700 is otherwise identical to device 500 of FIG. 5.

Figure 8:
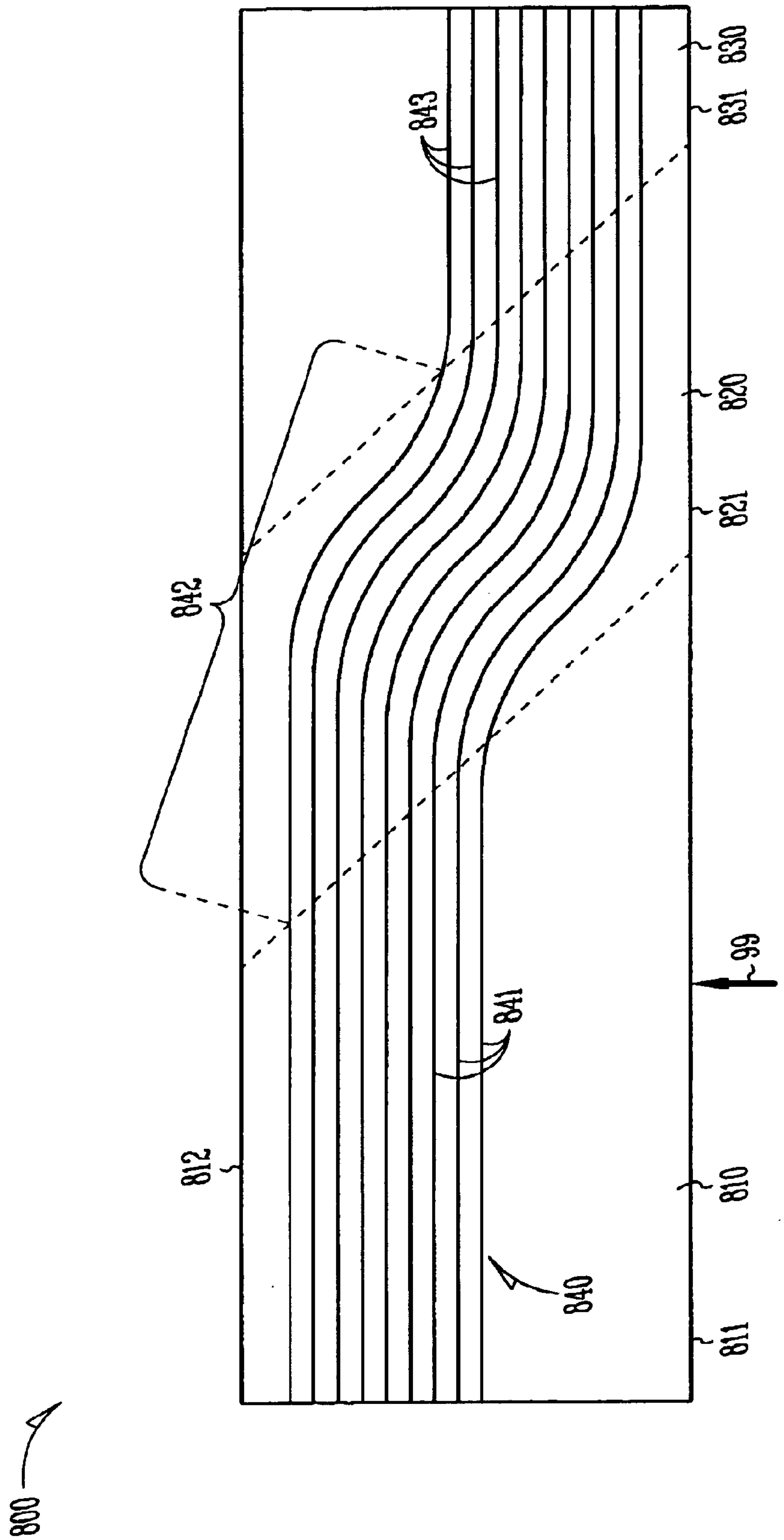
FIG. 8 shows a top isometric view of a waveguide device 800 having a plurality of signal waveguides passing left to right through a diagonally oriented doped region in order that the length of the waveguide within the doped region is longer, and further optionally including a serpentine waveguide path to make the doped length even longer.

One embodiment of the invention is illustrated by FIG. 8, which shows a top isometric view of a waveguide device 800 having a plurality of signal waveguides 840 passing left to right through a diagonally oriented doped region 820 in order that the length of the waveguide within the doped region 820 is longer than if region 820 was orthogonally oriented as in FIG. 3, but device 800 is otherwise similar to device 300 of FIG. 3. Some embodiments further include a serpentine waveguide path 842 to make the doped waveguide length even longer. In other embodiments, the waveguides 840 are straight end-to-end through device 800 to reduce signal light leakage due to the curves 842. In some embodiments, the pump light 800 is launched onto region 810 at face 811 to allow the largest surface area for launch, and face 812 is made reflective at the wavelength of the pump light. In some embodiments, pump light is also launched onto region 830 at face 832 to allow the largest surface area for launch, and face 831 is made reflective at the wavelength of the pump light.

Figure 9:
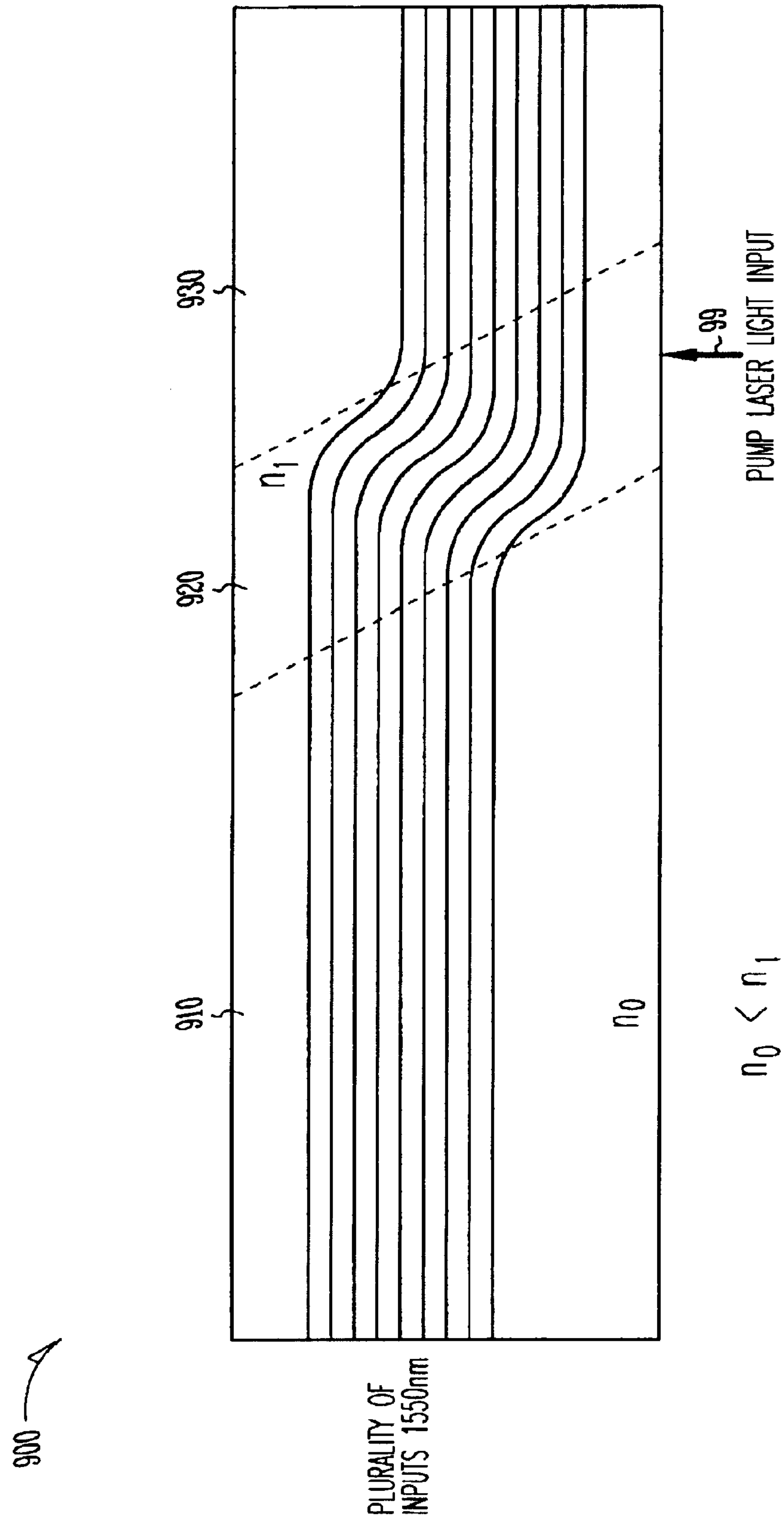
FIG. 9 shows a top isometric view of a waveguide device 900 having a plurality of signal waveguides passing left to right through a diagonally oriented doped region in order that the length of the waveguide within the doped region is longer, and further optionally including a serpentine waveguide path to make the doped length even longer and the diagonal doped region forming a pump waveguide passing bottom to top.

One embodiment of the invention is illustrated by FIG. 9, which shows a top isometric view of a waveguide device 900 having a plurality of signal waveguides passing left to right through a diagonally oriented doped region in order that the length of the waveguide within the doped region is longer, and further optionally including a serpentine waveguide path to make the doped length even longer and the diagonal doped region forming a pump waveguide passing bottom to top. Device 900 is similar to device 800 of FIG. 8. In some embodiments, region 920 is made very narrow to reduce cost of dopes material and/or to maximize the confinement and/or intensity of the pump light in the doped region. In some embodiments, the tilt of the doped region 930 is increased in order to lengthen the waveguide length in the doped region 930.

Figure 10:
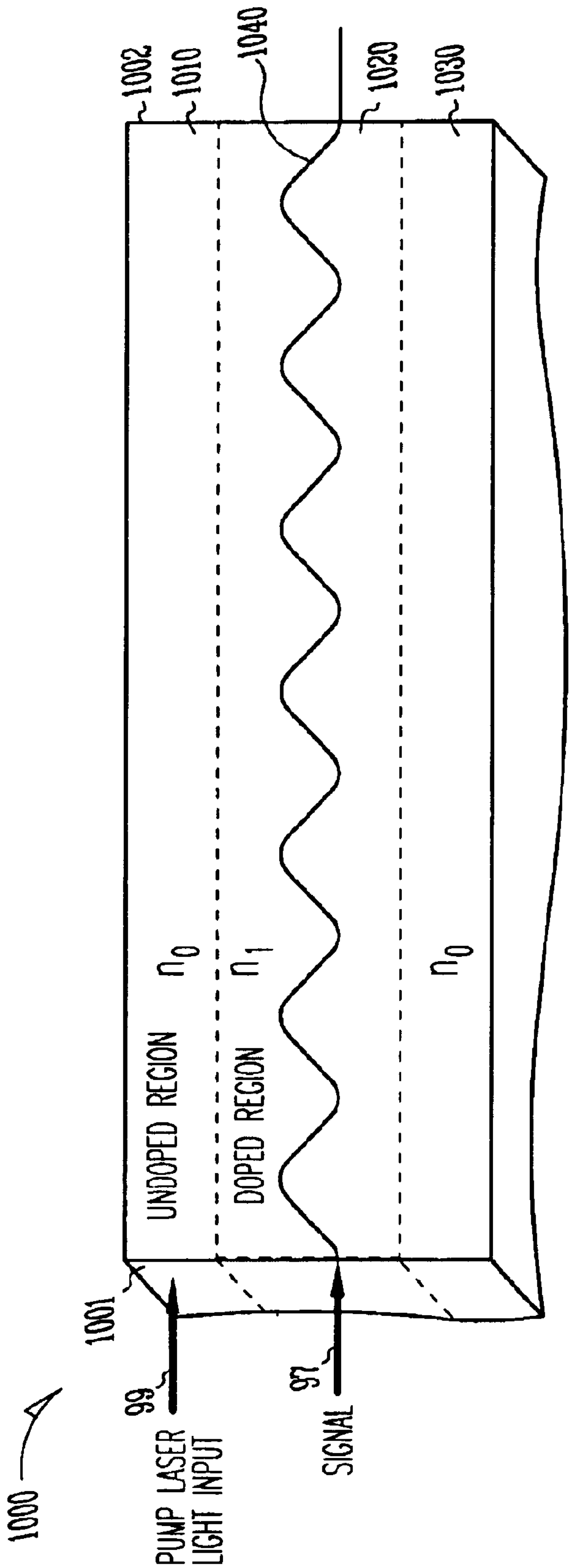
FIG. 10 shows a top isometric view of a waveguide device 1000 having a signal waveguide passing left to right longitudinally within a doped region and centered, and an undoped region n0 forming a pump (lossy) waveguide of lower index of refraction passing along both sides of the active region, one above and one below further optionally including a serpentine waveguide path to make the doped length even longer.

One embodiment of the invention is illustrated by FIG. 10, which shows a top isometric view of a waveguide device 1000 having a signal waveguide 1040 passing left to right longitudinally within a doped region 1020 and centered therein. In some embodiments, an undoped region 1010 and 1030 having index of refraction n0 forms a lossy transparent pump waveguide of lower index of refraction passing along both sides of the active region 1020, one above and one below. In some embodiments, face 1002 is made reflective at the pump light wavelength on regions 1010 and 1030 to maximize light containment and reflections. In some embodiments, device 1000 includes a serpentine pump region 1020 to allow a closer proximity of pump light to path 1040.

Figure 11:
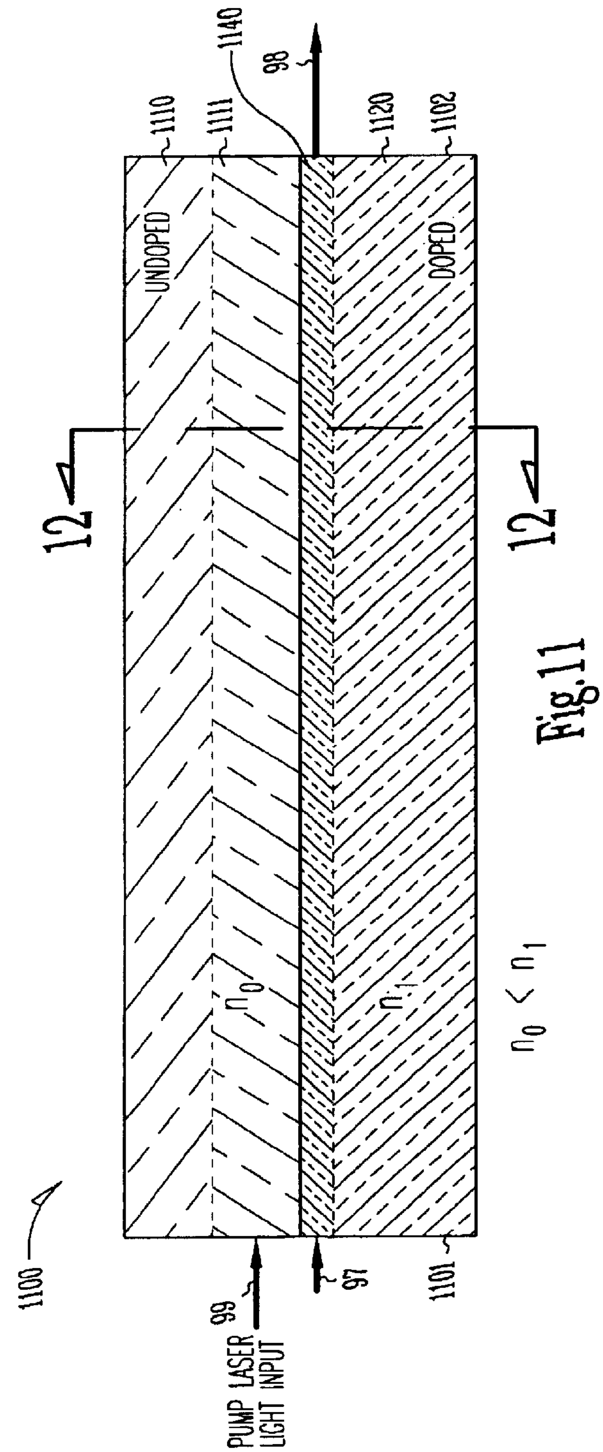
FIG. 11 shows a side view of a waveguide device 1100 having a signal waveguide passing left to right longitudinally within a doped region, and capped with an undoped pump waveguide.

One embodiment of the invention is illustrated by FIG. 11, which shows a side view of a waveguide device 1100 having a signal waveguide 1140 passing left to right longitudinally within a doped region 1120, and capped with an undoped overcladding 1110. In some embodiments, a pump waveguide 1111 having a higher index of refraction than that of cladding region 1110 is formed within cladding 1110. In some embodiments, pump light 99 and signal light 97 are launched into their respective waveguides at face 1101, and signal 98 exits through the opposite face 1102. In some embodiments, the overcladding 1110 is added to the various embodiments of FIGS. 1–10 to improve and/or increase the pump-light interface.

Figure 12:
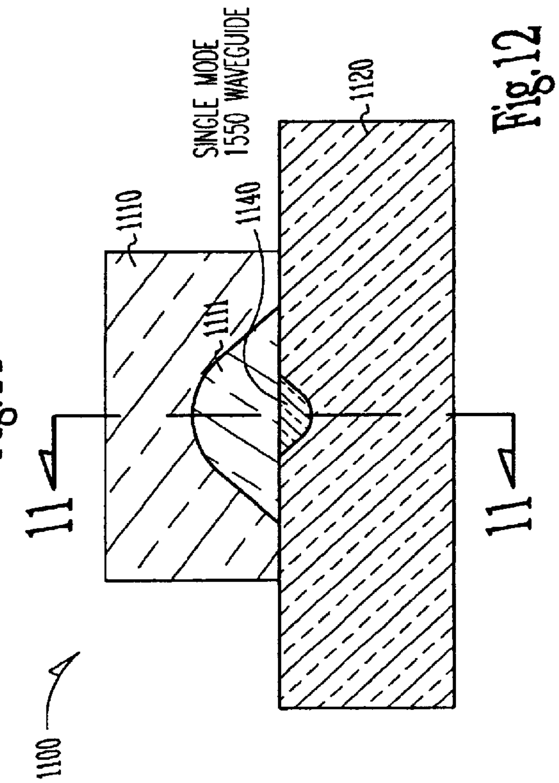
FIG. 12 shows an end view of the waveguide device 1100 having a signal waveguide passing left to right longitudinally within a doped region, and capped with an undoped pump waveguide.

One embodiment of the invention is illustrated by FIG. 12, which shows an end view of the waveguide device 1100 of FIG. 11. In some embodiments, the width of the overcladding is made very narrow (and/or tapered as in FIG. 13), in order to concentrate the pump light over the active waveguide 1140.

Figure 13:
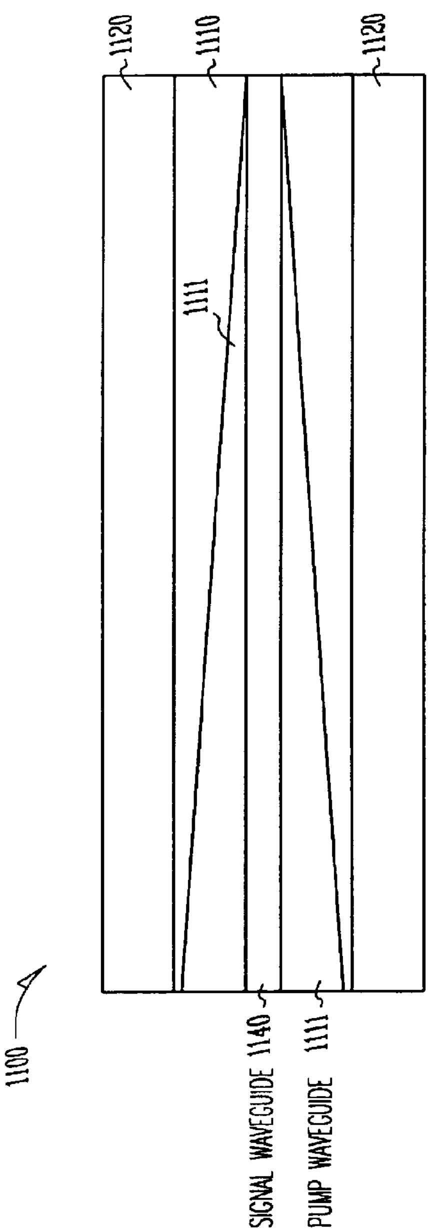
FIG. 13 shows a top view of one embodiment of the waveguide device 1100 having a signal waveguide passing left to right longitudinally within a doped region, and capped with a tapered undoped pump waveguide.

One embodiment of the invention is illustrated by FIG. 13, which shows a top view of one embodiment of the waveguide device 1100 having a signal waveguide passing left to right longitudinally within a doped region, and capped with a tapered undoped pump waveguide.

Figure 14:
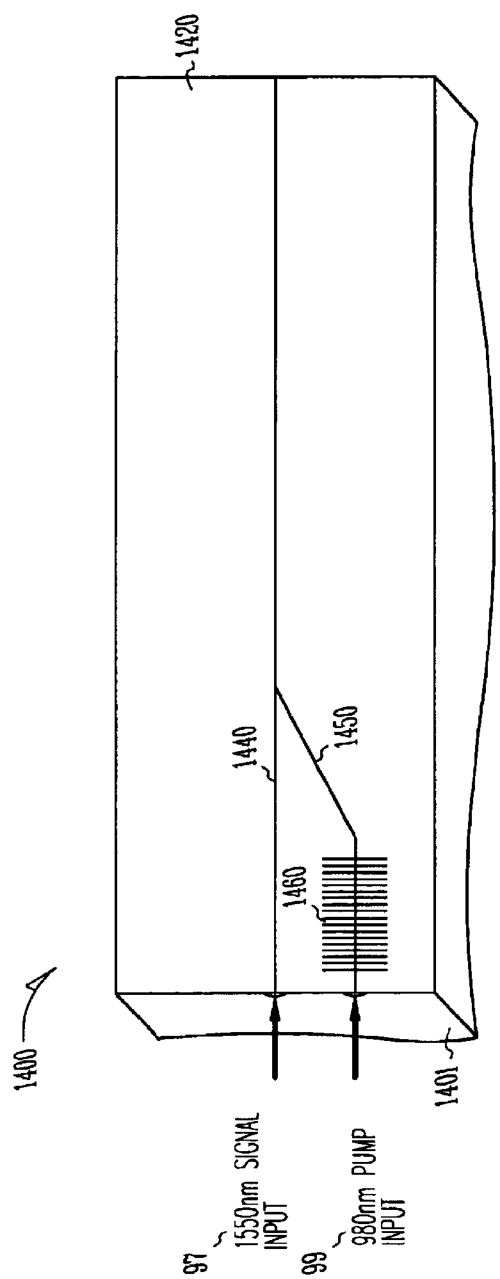
FIG. 14 shows a top isometric view of a waveguide device 1400 having a signal waveguide passing left to right longitudinally within a doped region and pump waveguide branching in from the side, wherein the pump waveguide includes a Bragg grating to stabilize the wavelength mode of the pump laser.

Another aspect of the invention is illustrated by FIG. 14, which shows a top isometric view of a waveguide device

1400 having a signal waveguide 1440 passing left to right longitudinally within a doped region 1420 and pump waveguide 1450 branching in from the side and joining waveguide 1440, wherein the pump waveguide includes a Bragg grating 1460 to stabilize the wavelength mode of the pump laser. In some embodiments, grating 1460 filters the pump light to let only a narrow bandwidth through. In other embodiments, grating 1460 forms a narrow bandwidth reflector that provides narrow bandwidth feedback to the pump laser (not shown), which in turn oscillates at a narrower bandwidth. In some embodiments, the stabilizing pump grating 1460 is combined with the embodiments shown in FIGS. 1–13.

Figure 15:
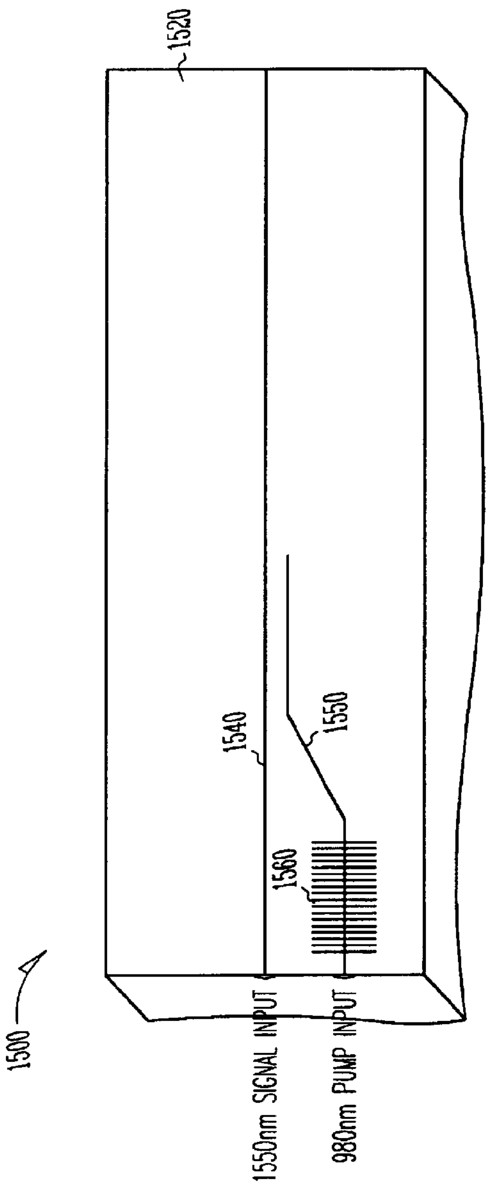
FIG. 15 shows a top isometric view of a waveguide device 1500 having a signal waveguide passing left to right longitudinally within a doped region and pump waveguide with evanescent coupling in from the side, wherein the pump waveguide includes a Bragg grating to stabilize the wavelength mode of the pump laser.

One embodiment of the invention is illustrated by FIG. 15, which shows a top isometric view of a waveguide device 1500 having a signal waveguide passing left to right longitudinally within a doped region and pump waveguide with evanescent coupling in from the side, wherein the pump waveguide includes a Bragg grating to stabilize the wavelength mode of the pump laser. This embodiment is identical to FIG. 14, except that pump waveguide 1550 is evanescently coupled to signal waveguide 1540 after passing through (or under or over) grating 1560.

Figure 16:
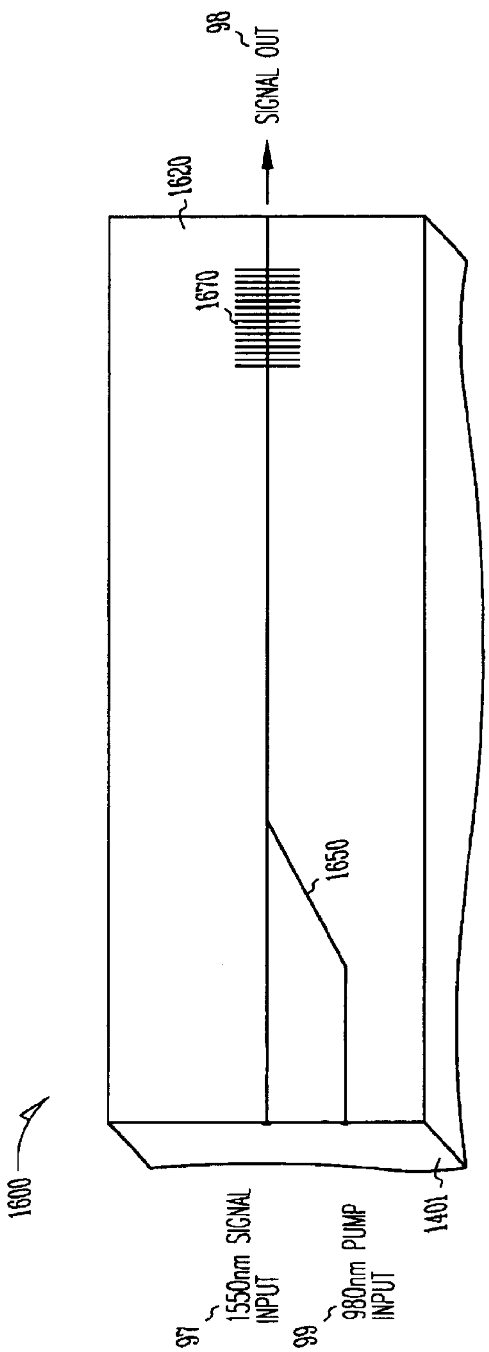
FIG. 16 shows a top isometric view of a waveguide device 1600 having a signal waveguide passing left to right longitudinally within a doped region and pump waveguide branching in from the side, wherein the signal waveguide includes a Bragg grating to flatten the gain-versus-frequency curve of the signal amplifier.

One embodiment of the invention is illustrated by FIG. 16, which shows a top isometric view of a waveguide device 1600 having a signal waveguide 1640 passing left to right longitudinally within a doped region 1620 and pump waveguide 1650 branching in from the side, wherein the signal waveguide includes a Bragg grating 1670 to flatten the gain-versus-frequency curve of the signal amplifier. In various embodiments, a gain-flattening grating 1670 is added to the embodiments described herein for the same purpose.

Figure 17:
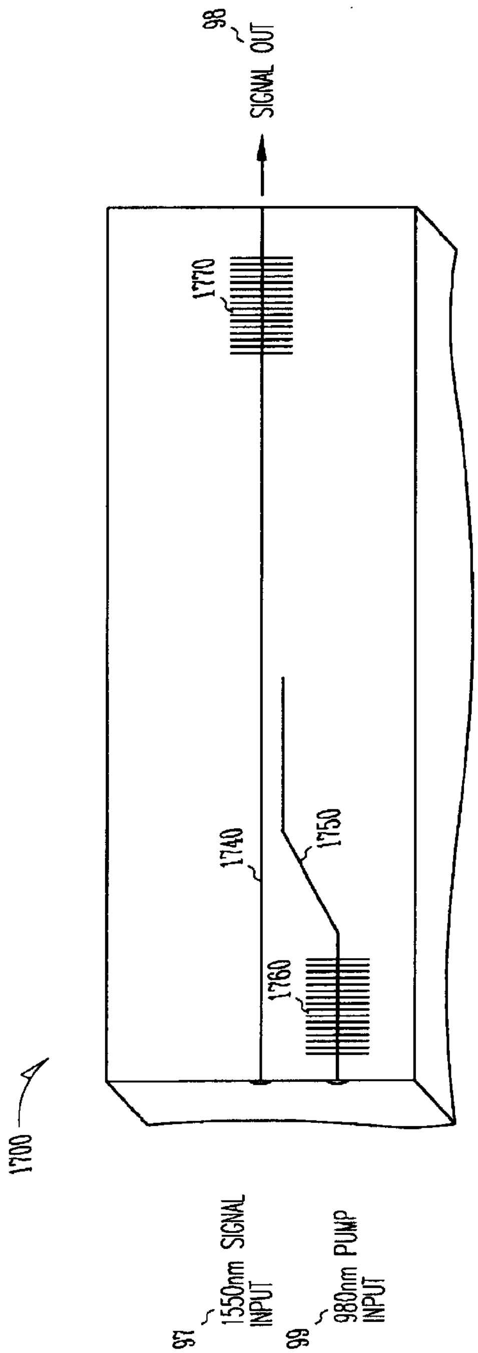
FIG. 17 shows a top isometric view of a waveguide device 1700 having a signal waveguide passing left to right longitudinally within a doped region and pump waveguide branching in from the side, wherein the signal waveguide includes a Bragg grating to flatten the gain-versus-frequency curve of the signal amplifier, combined with a pump waveguide branching in from the side, wherein the pump waveguide includes a Bragg grating to stabilize the wavelength mode of the pump laser.

One embodiment of the invention is illustrated by FIG. 17, which shows a top isometric view of a waveguide device 1700 combining the embodiments of FIG. 15 and FIG. 16, having a signal waveguide 1740 passing left to right longitudinally within a doped region 1720 and pump waveguide 1750 evanescently coupling in from the side, wherein the signal waveguide 1740 includes a Bragg grating 1770 to flatten the gain-versus-frequency curve of the signal amplifier, combined with a pump waveguide 1750 evanescently coupling in from the side, wherein the pump waveguide 1750 includes a Bragg grating 1760 to stabilize the wavelength mode of the pump laser.

Figure 18:
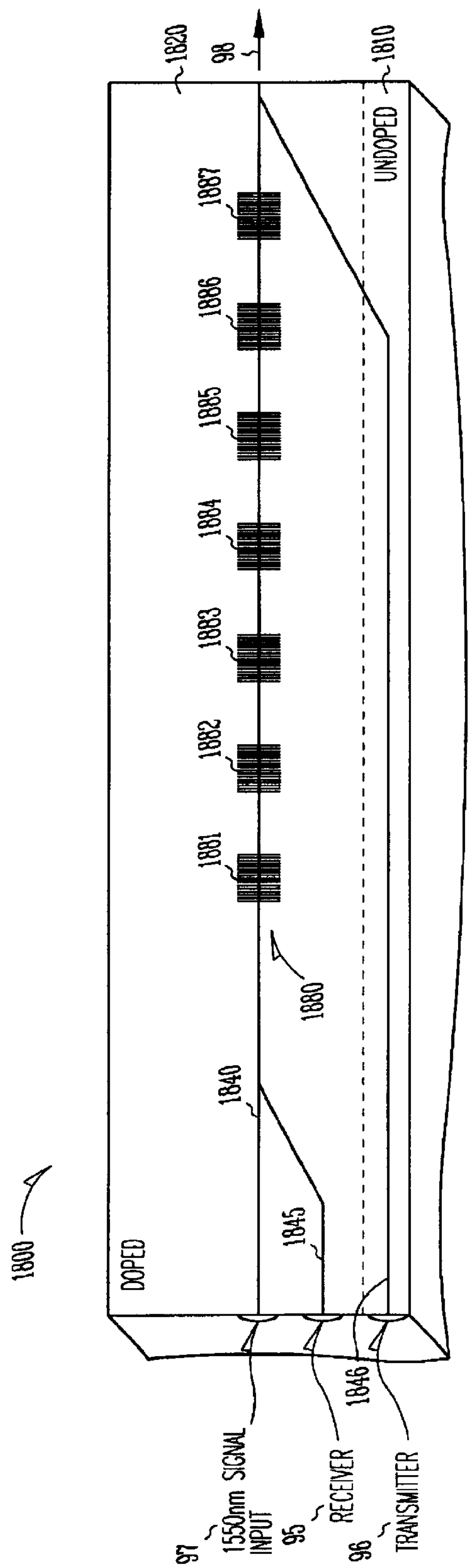
FIG. 18 shows a top isometric view of a drop/add waveguide device 1800 having a signal waveguide passing left to right longitudinally within a doped region having a plurality of selectable wavelength-sensitive Bragg reflector devices, one of which is activated to reflect, and the others which are deactivated (and are thus transparent), such that a signal input having several different wavelengths multiplexed into the single signal waveguide can have a single wavelength reflected to come back to a receiver waveguide, but the rest of the wavelengths continue on to the right (one signal wavelength being dropped from the plurality of signal wavelengths). Optionally, a transmitter input waveguide can accept a replacement signal wavelength to be added back in. In some embodiments, the transmitter waveguide passes mostly through undoped glass.

One embodiment of the invention is illustrated by FIG. 18, which shows a top isometric view of a drop/add waveguide device 1800 having a signal waveguide 1840 passing left to right longitudinally within a doped region 1820 having a plurality of selectable wavelength-sensitive Bragg reflector devices 1880, one of which (e.g., electrically selectable) is activated to reflect, and the others which (each having a different peak wavelength if reflective) are deactivated (and are thus transparent), such that a signal input 97 having several different wavelengths multiplexed into the single signal waveguide 1840 can have a single wavelength 95 reflected to come back to a receiver waveguide 1845, but the rest of the wavelengths continue on to the right (one signal wavelength being dropped from the plurality of signal wavelengths). Optionally, a transmitter input waveguide 1846 can accept a replacement signal wavelength to 96 be added back in. In some embodiments, the transmitter waveguide 1846 passes mostly through undoped glass 1810.

Figure 19:
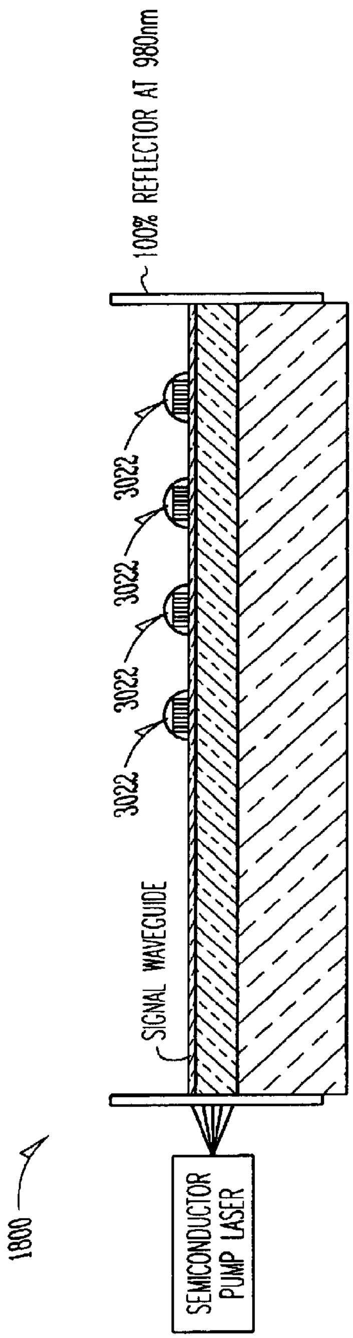
FIG. 19 shows a side view of the waveguide device 1800 of FIG. 18 having a signal waveguide passing left to right longitudinally within a doped region having a plurality of selectable wavelength-sensitive Bragg reflector devices, one of which is activated to reflect, and the others which are deactivated (and are thus transparent).

One embodiment of the invention is illustrated by FIG. 19, which shows a side view of the waveguide device 1800 of FIG. 18 having a signal waveguide passing left to right longitudinally within a doped region having a plurality of selectable wavelength-sensitive Bragg reflector devices, one of which is activated to reflect, and the others which are deactivated (and are thus transparent).

Figure 20:
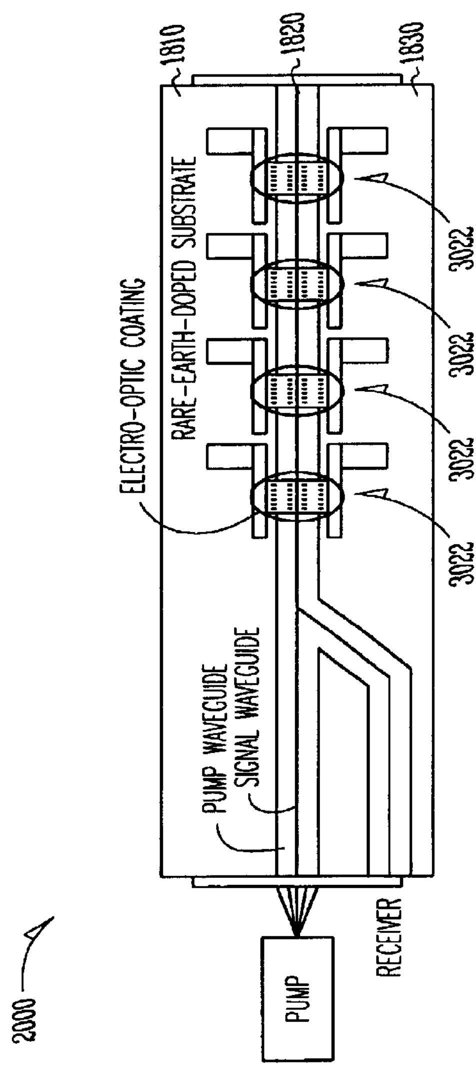
FIG. 20 shows a top view of one embodiment of a device 2000 similar to the waveguide device 1800 of FIG. 19 having a signal waveguide passing left to right longitudinally within a doped region having a plurality of selectable wavelength-sensitive Bragg reflector devices, one of which is activated to reflect, and the others which are deactivated (and are thus transparent).

One embodiment of the invention is illustrated by FIG. 20, which shows a top view of one embodiment of a device 2000 similar to the waveguide device 1800 of FIG. 19 having a signal waveguide passing left to right longitudinally within a doped region having a plurality of selectable wavelength-sensitive Bragg reflector devices, one of which is activated to reflect, and the others which are deactivated (and are thus transparent).

Figure 21:
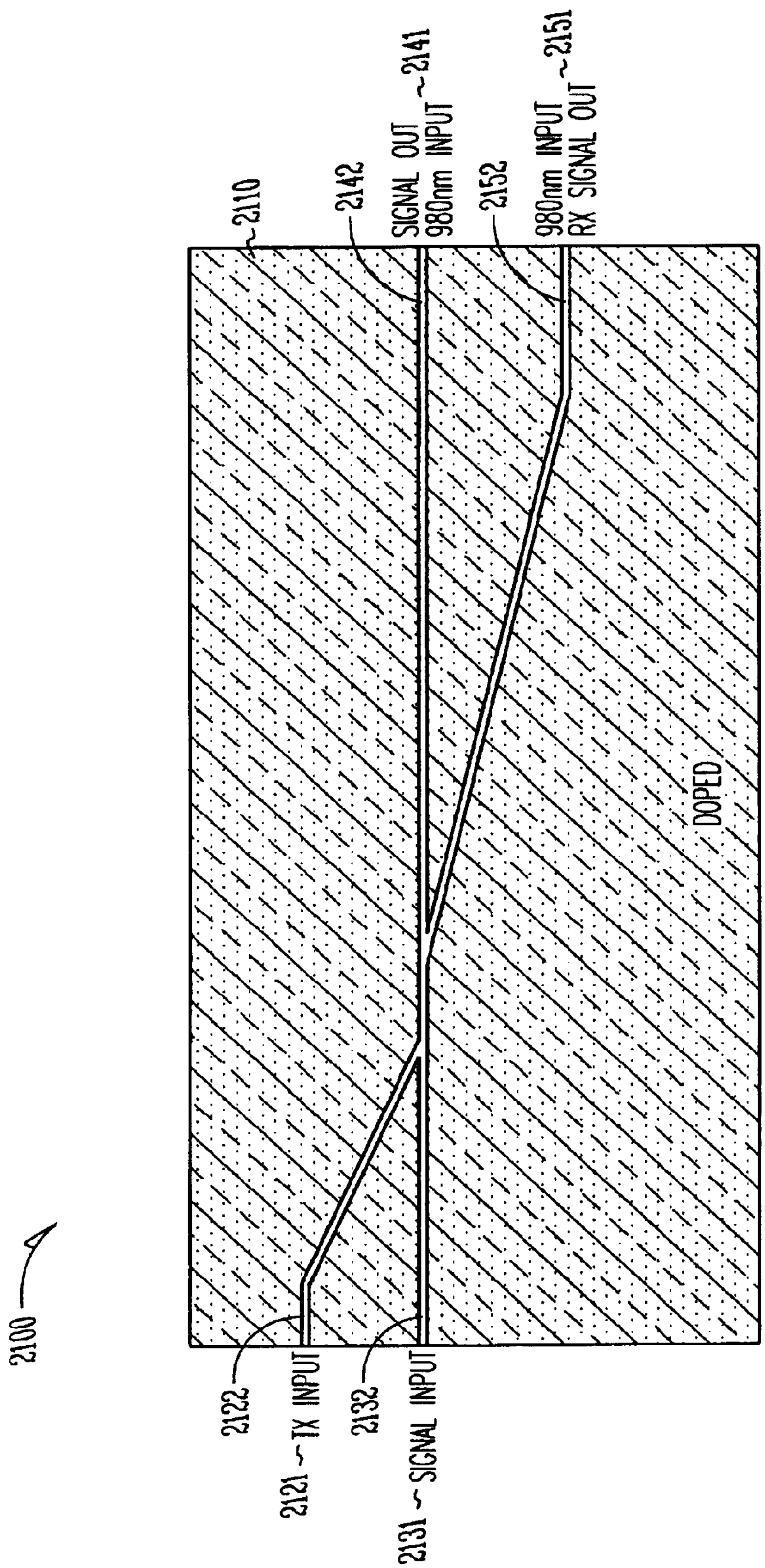
FIG. 21 shows a top view of a drop/add waveguide device 2100 having a signal waveguide passing left to right longitudinally within a doped region having sufficient doping and length that all signal is attenuated unless pump signal is added at one or both right-hand ports. Optionally, an input port for transmit signal to be added is provided in a doped region (since the entire substrate is doped in this embodiment) at the upper left.

One embodiment of the invention is illustrated by FIG. 21, which shows a top view of a drop/add waveguide device 2100 having a signal waveguide passing left to right longitudinally within a doped region having sufficient doping and length that all signal is substantially attenuated unless pump signal is added at one or both right-hand ports. Optionally, an input port for transmit signal to be added is provided in a doped region (since the entire substrate is doped in this embodiment) at the upper left.

Figure 22:
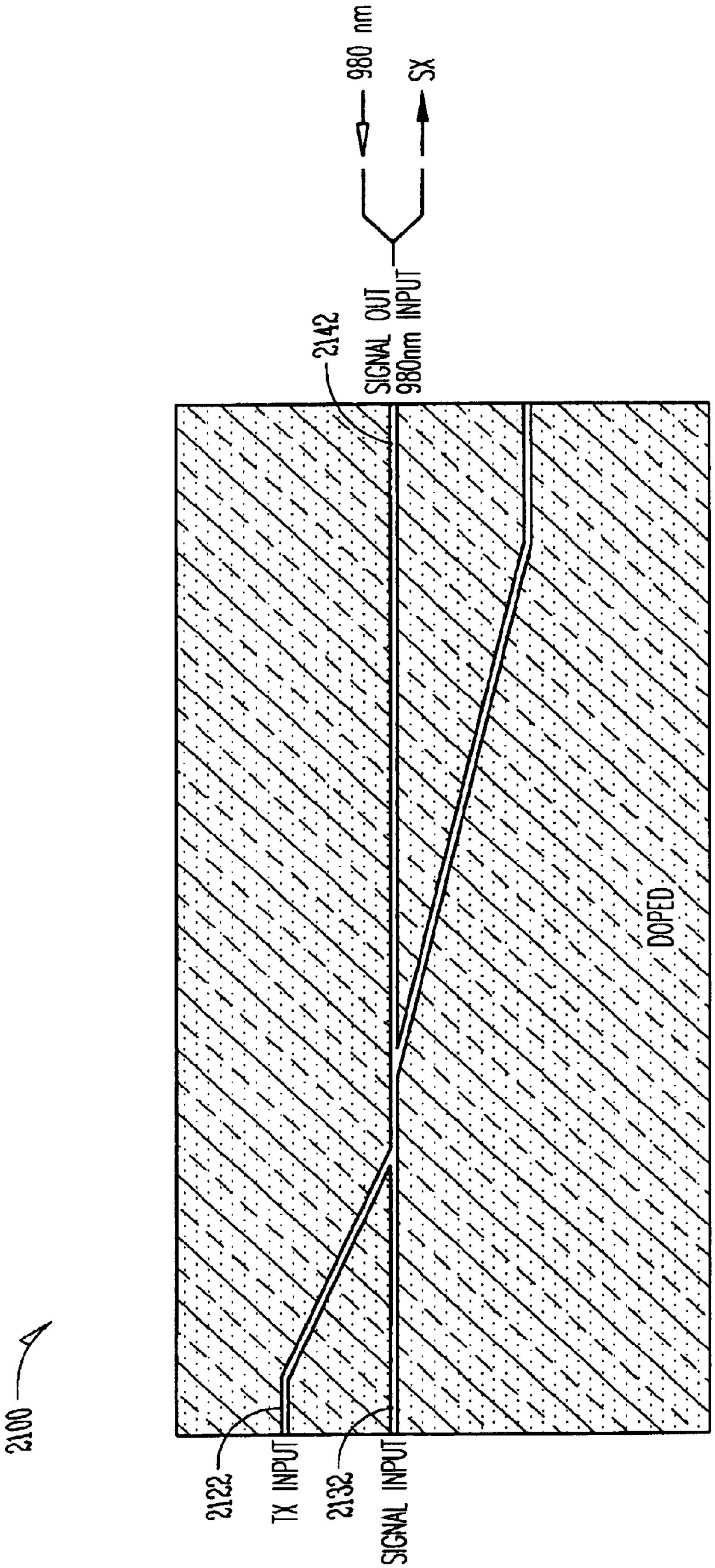
FIG. 22 shows a top view of the waveguide device 2100 of FIG. 21 having a signal waveguide passing left to right longitudinally within a doped region, wherein pump light is injected only into the upper right-hand port such that the upper waveguide to the right passes the amplified signal, yet the lower waveguide to the right attenuates the signal sufficiently to say that the signal is not passed to that waveguide.

One embodiment of the invention is illustrated by FIG. 22, which shows a top view of the waveguide device 2100 of FIG. 21 having a signal waveguide passing left to right longitudinally within a doped region, wherein pump light is injected only into the upper right-hand port such that the upper waveguide to the right passes the amplified signal, yet the lower waveguide to the right attenuates the signal sufficiently to say that the signal is not passed to that waveguide.

Figure 23:
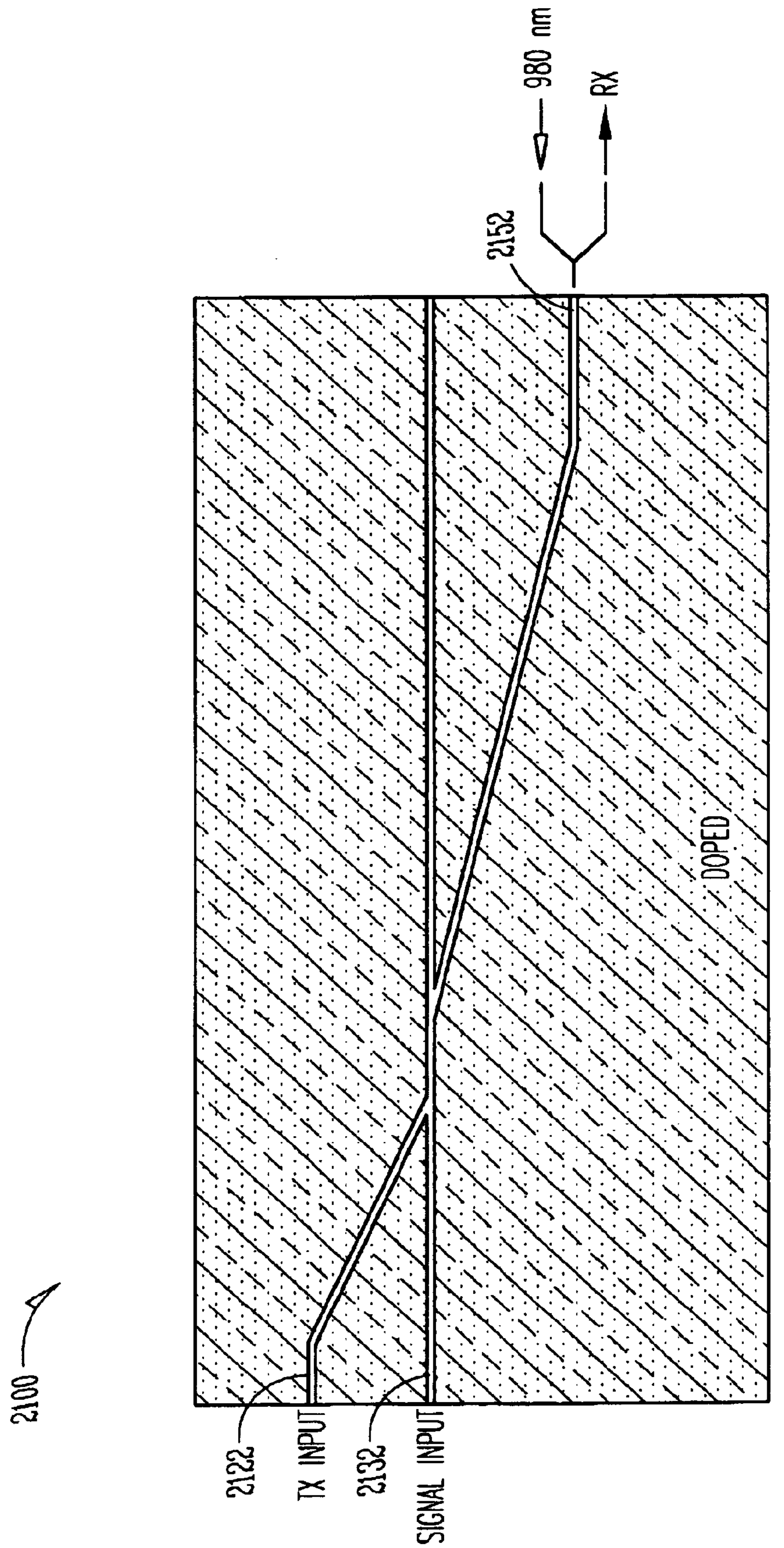
FIG. 23 shows a top view of the waveguide device 2100 of FIG. 21 having a signal waveguide passing left to right longitudinally within a doped region, wherein pump light is injected both into the upper right-hand port and the lower right-hand port such that both the lower and the upper waveguides to the right pass the amplified signal.

One embodiment of the invention is illustrated by FIG. 23, which shows a top view of the waveguide device 2100 of FIG. 21 having a signal waveguide passing left to right longitudinally within a doped region, wherein pump light is injected both into the upper right-hand port and the lower right-hand port such that both the lower and the upper waveguides to the right pass the amplified signal.

Figure 24:
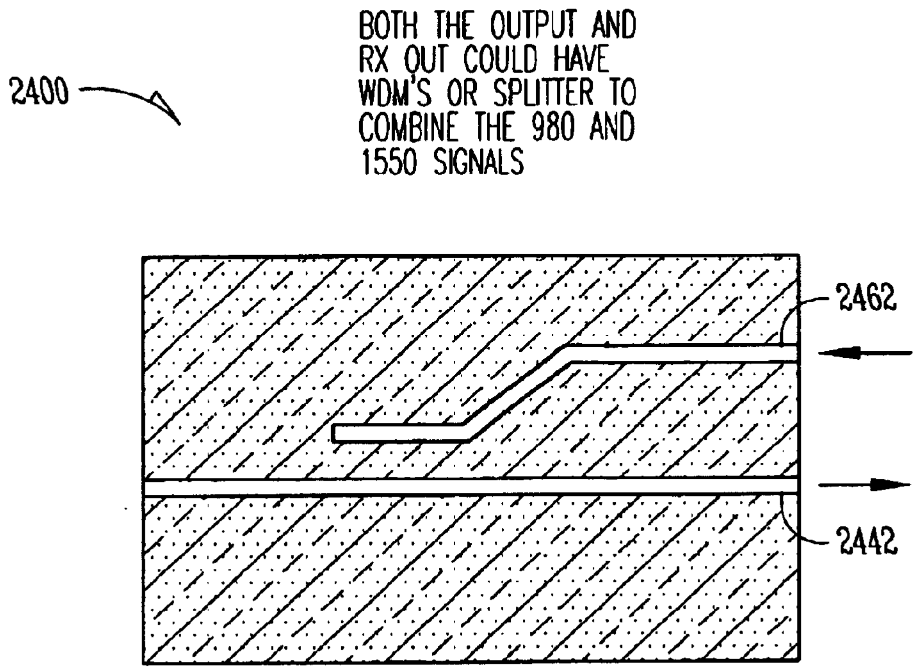
FIG. 24 shows a top view of an external evanescent waveguide coupler 2400 that can be used with or integrated onto the waveguide device of FIG. 21. This coupler has a pump input for 980 nm light and a signal output for 1550 nm light.

One embodiment of the invention is illustrated by FIG. 24, which shows a top view of an external evanescent waveguide coupler 2400 that can be used with or integrated onto the waveguide device of FIG. 21. This coupler has a pump input for 980 nm light and a signal output for 1550 nm light.

Figure 25:
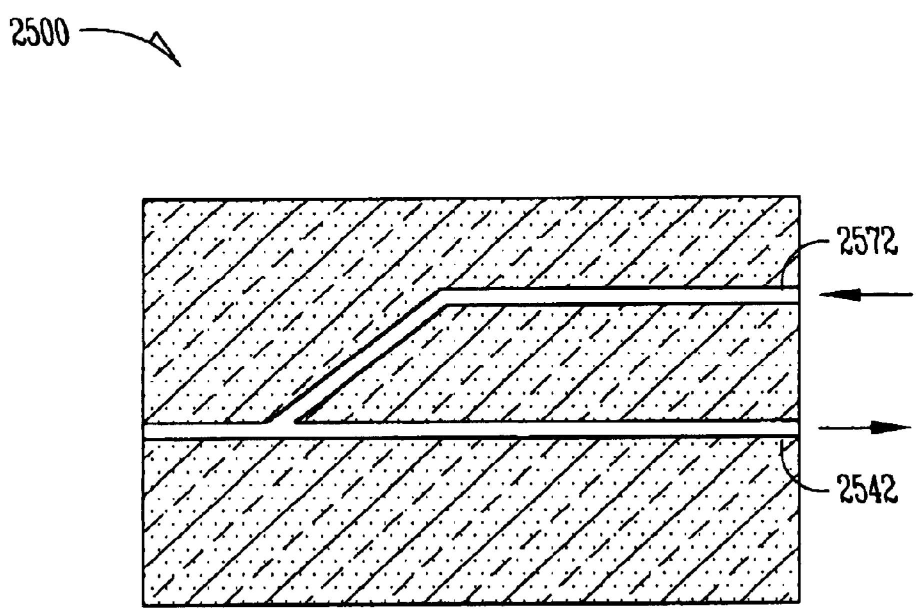
FIG. 25 shows a top view of an external branched waveguide coupler 2500 that can be used with or integrated onto the waveguide device 2100 of FIG. 21. This coupler has a pump input for 980 nm light and a signal output for 1550 nm light.

One embodiment of the invention is illustrated by FIG. 25, which shows a top view of an external branched waveguide coupler 2500 that can be used with or integrated onto the waveguide device 2100 of FIG. 21. This coupler has a pump input for 980 nm light and a signal output for 1550 nm light.

Figure 26:
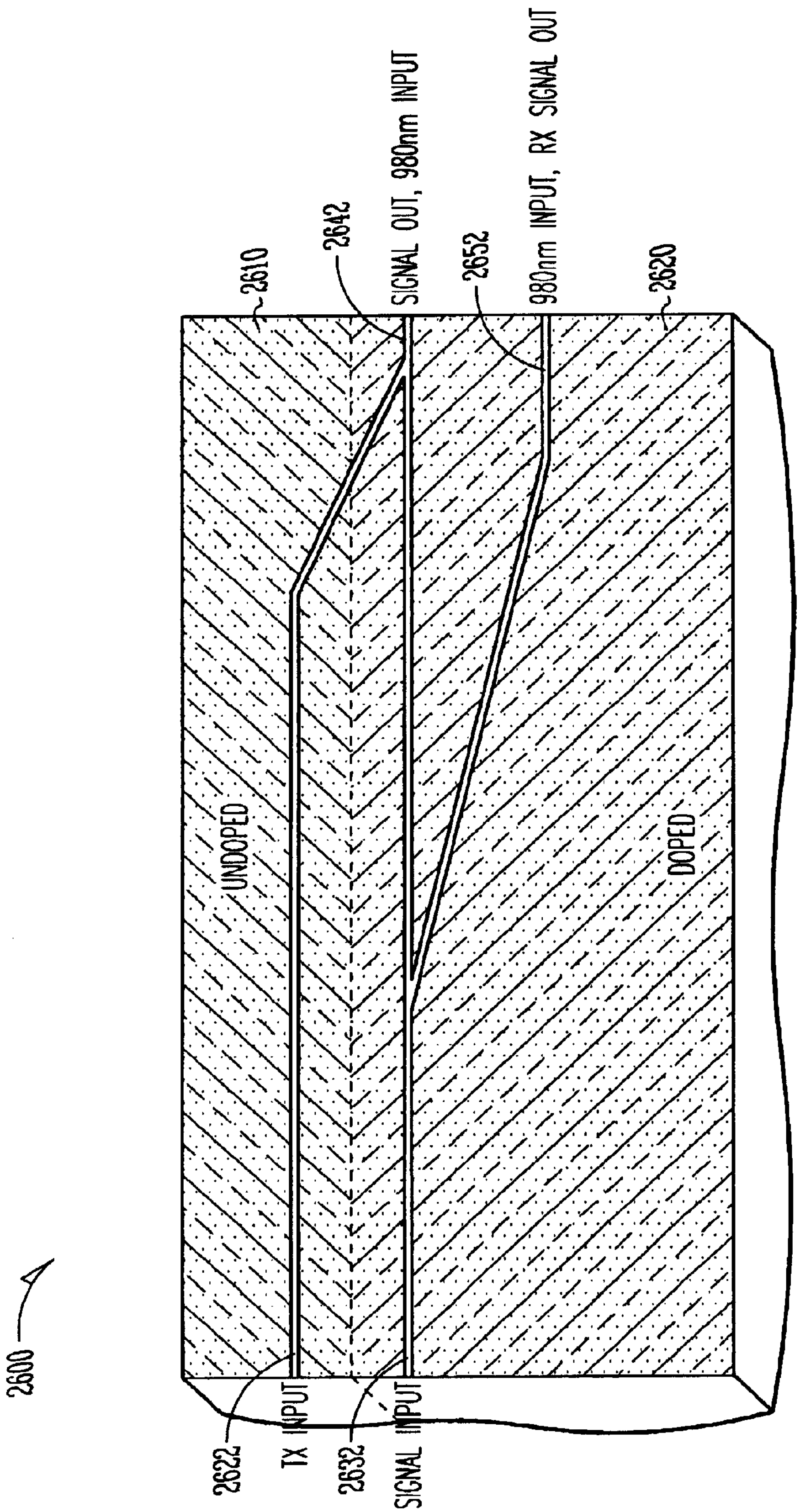
FIG. 26 shows a top view of a drop/add waveguide device 2600 having a signal waveguide passing left to right longitudinally within a doped region having sufficient doping and length that all signal is attenuated unless pump signal is added at one or both right-hand ports. Optionally, a transmitter input waveguide can accept a replacement input signal wavelength to be added back in. In some embodiments, the transmitter waveguide passes mostly through undoped glass that us fused along the upper edge of the doped region.

One embodiment of the invention is illustrated by FIG. 26, which shows a top view of a drop/add waveguide device 2600 having a signal waveguide passing left to right longitudinally within a doped region having sufficient doping and length that all signal is attenuated unless pump signal is added at one or both right-hand ports. Optionally, a transmitter input waveguide can accept a replacement input signal wavelength to be added back in. In some embodiments, the transmitter waveguide passes mostly through undoped glass that us fused along the upper edge of the doped region.

Figure 27:
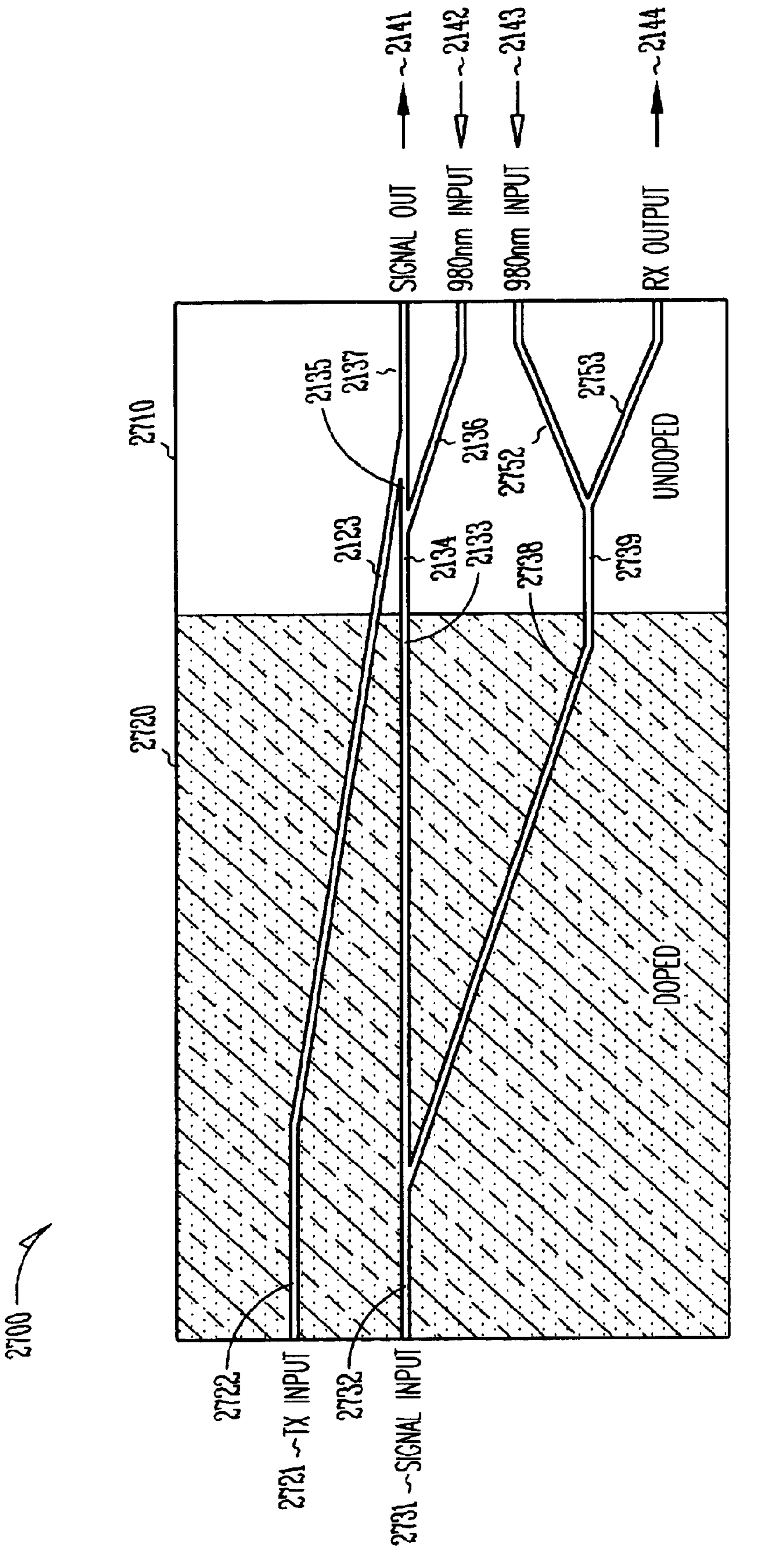
FIG. 27 shows a top view of a drop/add waveguide device 2700 having a signal waveguide passing left to right longitudinally within a doped region having sufficient doping and length that all signal is attenuated unless pump signal is added at one or both right-hand ports. An undoped region is fused to the right hand side of the doped region. Optionally, an input port for transmit signal to be added is provided in a doped region (since the entire left side of the substrate is doped in this embodiment) at the upper left, along with pump light sufficient to provide amplification to compensate for attenuation in that waveguide.

One embodiment of the invention is illustrated by FIG. 27, which shows a top view of a drop/add waveguide device 2700 having a signal waveguide passing left to right longitudinally within a doped region having sufficient doping and length that all signal is attenuated unless pump signal is added at one or both right-hand ports. An undoped region is fused to the right hand side of the doped region. Optionally, an input port for transmit signal to be added is provided in a doped region (since the entire left side of the substrate is doped in this embodiment) at the upper left, along with pump light sufficient to provide amplification to compensate for attenuation in that waveguide.

Figure 28:
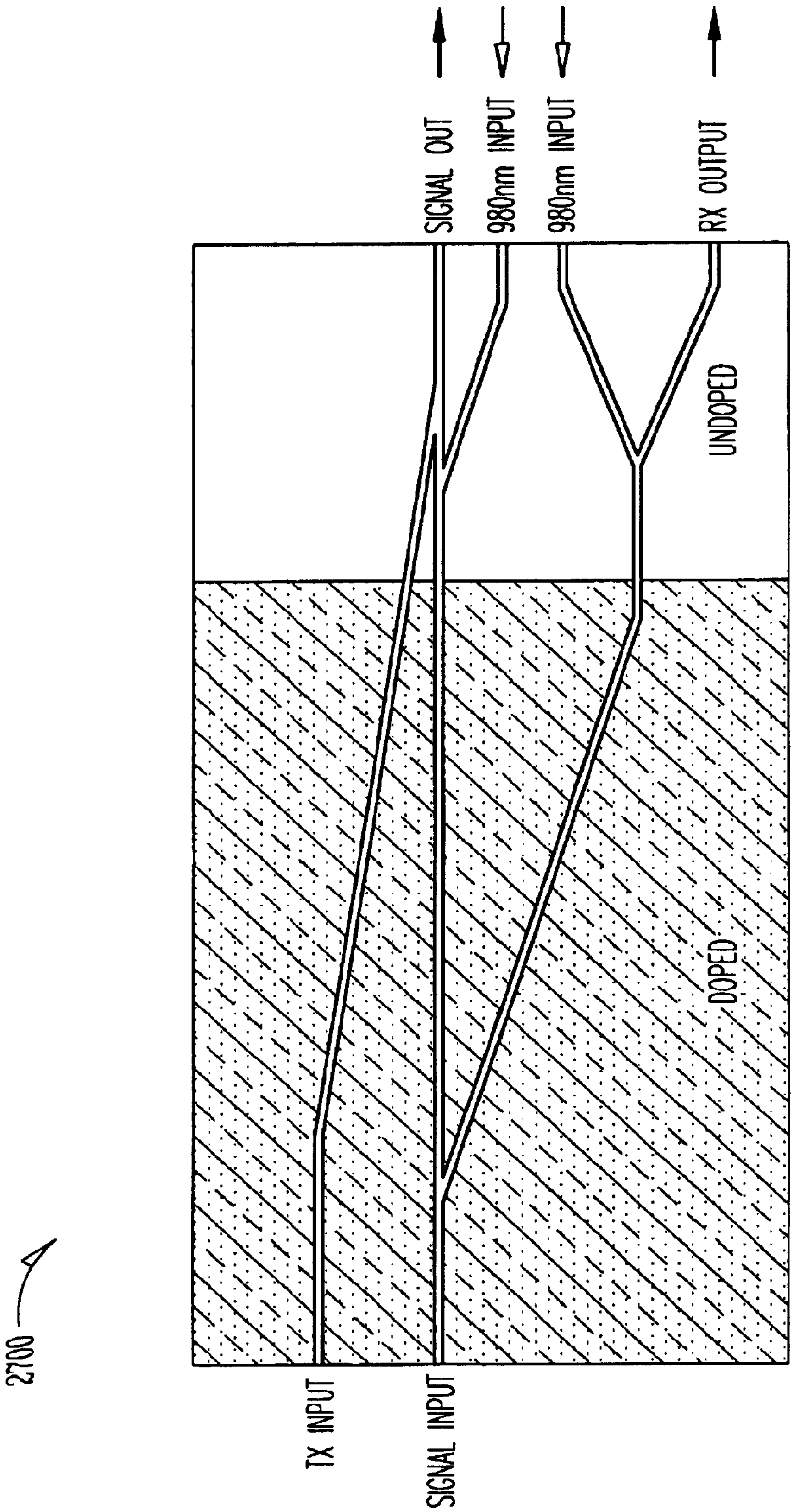
FIG. 28 shows a top view of the waveguide device 2700 of FIG. 27 having a signal waveguide passing left to right longitudinally within a doped region, wherein pump light is injected both into the upper right-hand pump port and the lower right-hand pump port such that both the lower and the upper waveguides to the right pass the amplified signal.

One embodiment of the invention is illustrated by FIG. 28, which shows a top view of the waveguide device 2700 of FIG. 27 having a signal waveguide passing left to right longitudinally within a doped region, wherein pump light is injected both into the upper right-hand pump port and the lower right-hand pump port such that both the lower and the upper waveguides to the right pass the amplified signal.

Figure 29:
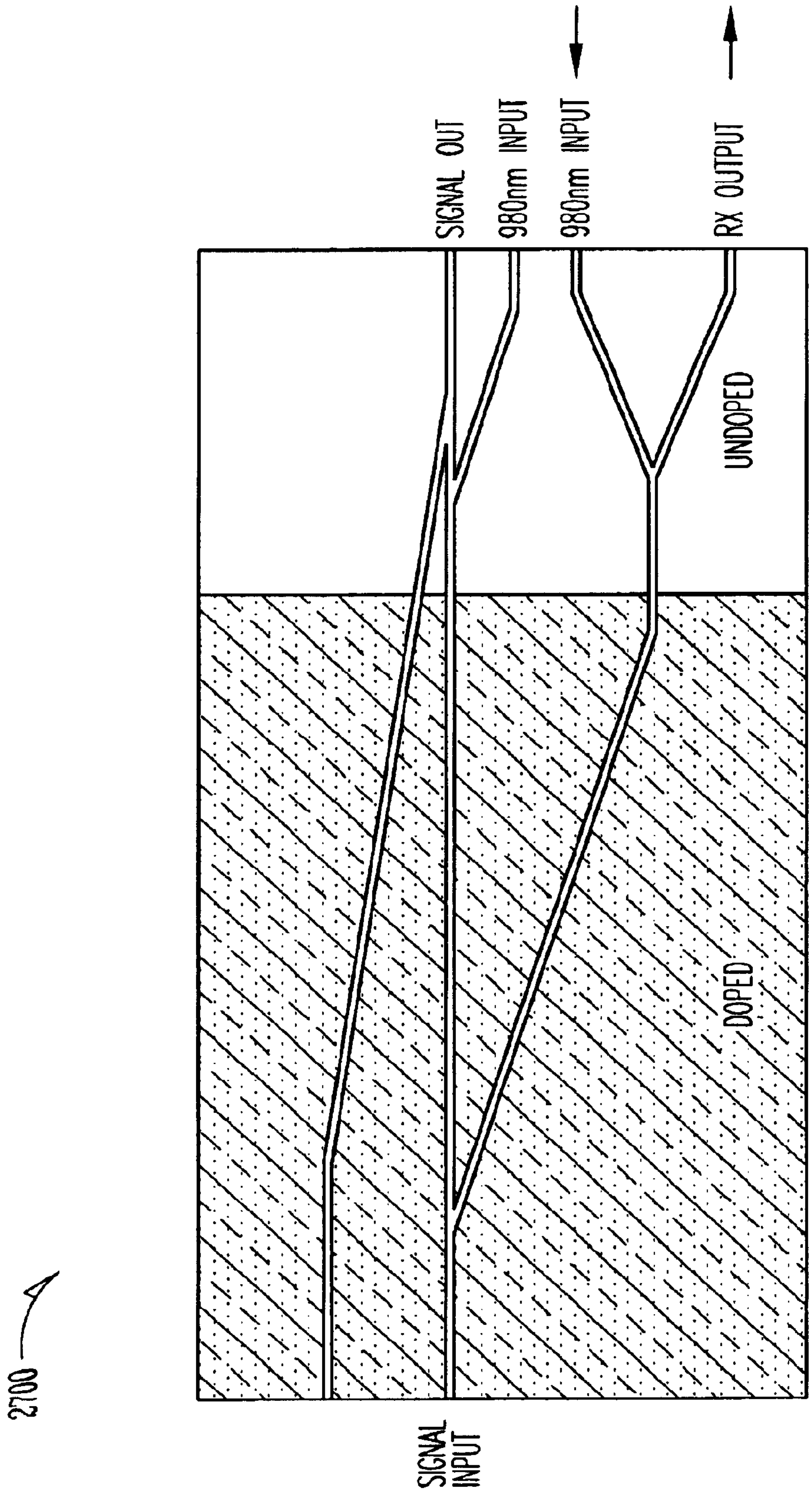
FIG. 29 shows a top view of the waveguide device 2700 of FIG. 27 having a signal waveguide passing left to right longitudinally within a doped region, wherein pump light is injected only into the lower right-hand pump port such that the lower waveguide to the right passes the amplified signal, yet the middle waveguide to the right attenuates the signal sufficiently to say that the signal is not passed to that waveguide.

One embodiment of the invention is illustrated by FIG. 29, which shows a top view of the waveguide device 2700 of FIG. 27 having a signal waveguide passing left to right longitudinally within a doped region, wherein pump light is injected only into the lower right-hand pump port such that the lower waveguide to the right passes the amplified signal, yet the middle waveguide to the right attenuates the signal sufficiently to say that the signal is not passed to that waveguide.

Figure 30:
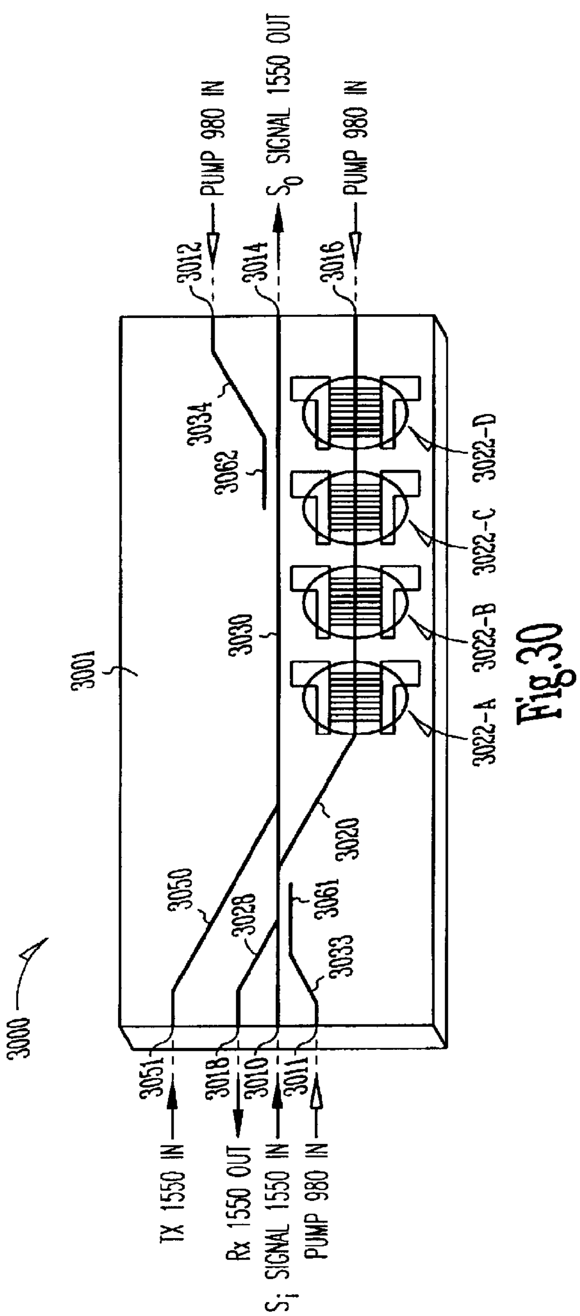
FIG. 30 shows a top view of an active waveguide device 3000 having a signal waveguide 3030 passing left to right longitudinally within a heavily doped substrate 3001.

One embodiment of the invention is illustrated by FIG. 30, which shows a top perspective view (not to scale) of a waveguide device 3000 having a signal waveguide passing left to right longitudinally within a heavily doped substrate 3001, wherein pump light is injected into the lower right-hand pump port 3021 only if a received signal is desired, such that the lower waveguide 3020 passes the pump light right to left. For example, a plurality of wavelengths at about 1530 nm to 1550 nm having a 0.8 nm or a 0.4 nm wavelength spacing between channels, and each channel amplitude-modulated with a data stream (one or more of these channels of light is/are collectively called "1550 signal" whether input or output from the device 3000), are combined and transmitted across a single-mode optical fiber, and provide the "signal in" light that is launched into port 3010. The doping in substrate 3001 is made high enough that unless pump light is added, the dopants will absorb substantially all of the signal, and substantially no signal is output through signal-output port 3014 or received-signal port 3018.

Figure 37:
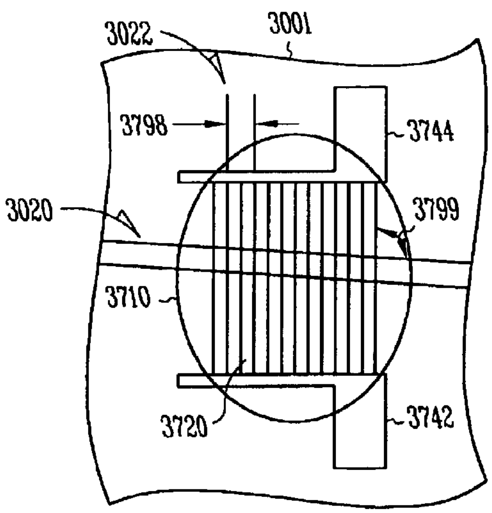
FIG. 37 shows a top view (not to scale) of a waveguide device wavelength-sensitive electrically controlled electro-optic grating reflector 3022.
Figure 38:
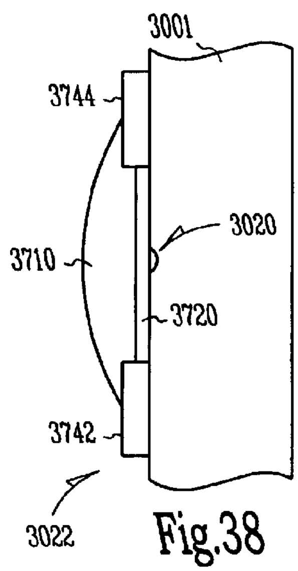
FIG. 38 shows a side view (not to scale) of a waveguide device wavelength-sensitive electrically controlled electro-optic grating reflector 3022.
Figure 39:
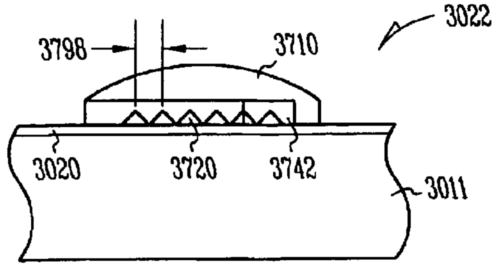
FIG. 39 shows a front view (not to scale) of a waveguide device wavelength-sensitive electrically controlled electro-optic grating reflector 3022.

A plurality of wavelength-sensitive electrically controlled electro-optic grating reflectors 3022-A, 3022-B, 3022-C, and 3022-D are provided. Four wavelength-sensitive electrically controlled electro-optic grating reflectors 3022 are shown here, other embodiments use one or more. FIGS. 37 to 39 below show details of one such exemplary electro-optic grating reflector 3022. In some embodiments, all of the gratings have the same physical spacings, but the waveguide 3020 passes under each grating at a slightly different angle, so the effective spacings are each different. In some embodiments, all of the gratings have the same physical spacings, but the waveguide 3020 is a different width (providing a different index of refraction) under each grating, so the effective grating spacings are each different. In other embodiments, the grating spacings are each different.

Optionally, a pump-light port 3011 couples to an optional waveguide 3033 that leads to optional evanescent coupler 3061 that injects pump light into waveguide 3030. Optionally, a transmit signal light port 3051 accepts signal "Tx 1550 In" into waveguide 3050, which adds this signal to that going left-to-right (the amplified "Si Signal 1550 In" on waveguide 3030, at a point after (to the right) of the branch-off point for waveguide 3020, in order that the added signal "Tx 1550 In" does not go to the reflectors 3022.

In some embodiments, an activation or deactivation voltage is applied to each one of the wavelength-sensitive electrically controlled electro-optic grating reflectors 3022, e.g., one reflector 3022 will have a voltage that makes the index of refraction of the electro-optic coating different than the index of refraction of the grating such that only that one grating is reflective, and all the others will have a voltage that makes the index of refraction of the electro-optic coating match the index of refraction of the grating, such that those gratings 3022 are transparent (as if there were no grating). The one reflector 3022 that is reflective is reflective only at a sharply defined wavelength defined by the grating spacing and the indices of refraction of the materials, thus selecting only that wavelength to be reflected to exit through port 3018. No other wavelength or light is reflected towards the left, so only the selected wavelength goes out to port 3018. Gratings 3022 are always transparent to the pump wavelength (e.g., 980 nm laser light) In some embodiments, additional pump light is launched into port 3018 to further amplify the selected wavelength. Waveguide 3030 provides a through-path for the amplified signal input into port 3010 only if additional pump light is launched into port 3012 (this light is evanescently coupled into waveguide 3030 by evanescent coupler 3062, and propagates only toward the left), yet the middle waveguide 3030 to the right attenuates the input signal sufficiently to say that the signal is not passed to output port 3014 if no pump light is added to port 3012. Thus, in some embodiments, the received signal Rx (reflected by one of the gratings 3022 and routed back to waveguide 3028 that splits off waveguide 3030) is output from port 3018 only if pump light is launched into port 3016, and the input signal received into port 3010 is amplified and output as So Signal 1550 Out from port 3014 only if pump light is launched into port 3012 (into waveguide 3034, and then crossing to waveguide 3030 at evanescent coupler 3062).

Figure 31:
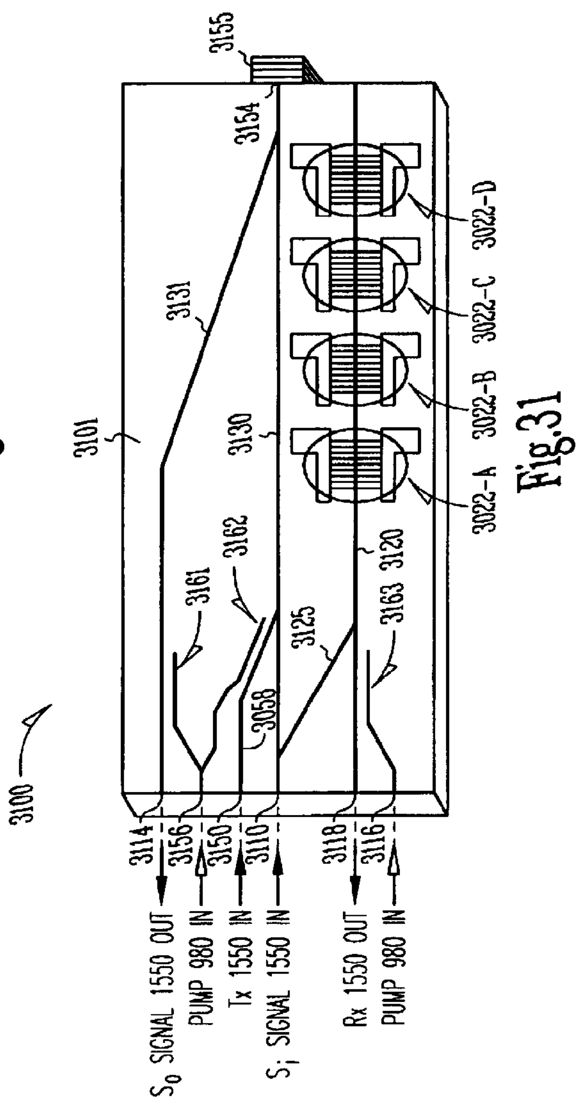
FIG. 31 shows a top view of an active waveguide device 3100 with all ports on a single face of substrate 3101.

One embodiment of the invention is illustrated by FIG. 31, which shows a top perspective view (not to scale) of a waveguide device 3100 having a signal waveguide passing left to right longitudinally within a heavily doped substrate 3101, wherein pump light is injected into the lower left-hand pump port 3116 (and thus across evanescent coupler 3163) only if a received signal (Rx 1550 out) is desired, such that the lower waveguide 3120 passes the pump light left-to-right and the Rx signal right-to-left. In this embodiment, all light input and output ports are located on a single face (the left face) of substrate 3101. A plurality of wavelength-sensitive electrically controlled electro-optic grating reflectors 3022-A, 3022-B, 3022-C, and 3022-D are provided (four wavelength-sensitive electrically controlled electro-optic grating reflectors are shown here, other embodiments use one or more). In some embodiments, an activation or deactivation voltage is applied to each one of the wavelength-sensitive electrically controlled electro-optic grating reflectors 3022, such that only one is reflective and all the others are transparent. The one that is reflective is reflective only at a sharply defined wavelength defined by the grating spacing and the indices of refraction of the materials, thus selecting only that wavelength to be reflected to exit through port 3118. No other wavelength or light is reflected towards the left in waveguide 3120, so only the selected wavelength goes to port 3118. In some embodiments, additional pump light is launched into port 3116 to further amplify the selected wavelength. In some embodiments, only when additional pump light is launched into port 3116 does any appreciable signal reach port 3118. Waveguides 3130 and 3131 provide a through-path for the signal input that was launched into port 3110 and reflected by mirror 3155 (e.g., a multi-layer dielectric mirror deposited on the edge of substrate 3101 at least covering waveguide end 3154)) only if additional pump light is launched into port 3156 (this light is evanescently coupled into return waveguide 3131 by evanescent coupler 3161, and propagates only toward the right in waveguide 3131, and this light is also evanescently coupled into waveguide 3158 and 3130 by evanescent coupler 3162, and propagates only toward the right, amplifying the Signal-1550-in and the Tx-1550-in signals), yet the middle waveguide 3130 and return waveguide 3131 attenuate the input signal sufficiently to say that the signal is not passed to output port 3114 if no pump light is added to port 3156. In some embodiments, waveguides 3130 and 3131 provide a through-path for the signal input only if additional pump light is launched into port 3157 (which is evanescently coupled into Tx waveguide 3158 by evanescent coupler 3162, and propagates then into waveguide 3130 going left-to-right). In some embodiments, waveguides 3130 and 3131 provide a through-path for the signal input only if additional pump light is launched both into port 3157 and into port 3156.

In some embodiments, one or more channels of data (i.e., a laser light signal that is amplitude-modulated with a digital data stream) can be added to the input signal by launching those one or more channels into Tx signal input port 3150, and adding pump light into port 3157.

The doping in substrate 3101 is made high enough that unless pump light is added, the dopants will absorb substantially all of the signal, and substantially no signal is output through signal-output port 3114 or received-signal port 3118.

Thus, in some embodiments, the received signal Rx is output from port 3118 only if pump light is launched into port 3016 and one of the wavelength-sensitive electrically controlled electro-optic grating reflectors 3022-A, 3022-B, 3022-C, and 3022-D is made reflective, and the input signal received into port 3110 is output from port 3114 only if pump light is launched into port 3156 and/or port 3157. In other embodiments, fewer or more electro-optic grating reflectors 3022 are provided.

Figure 32:
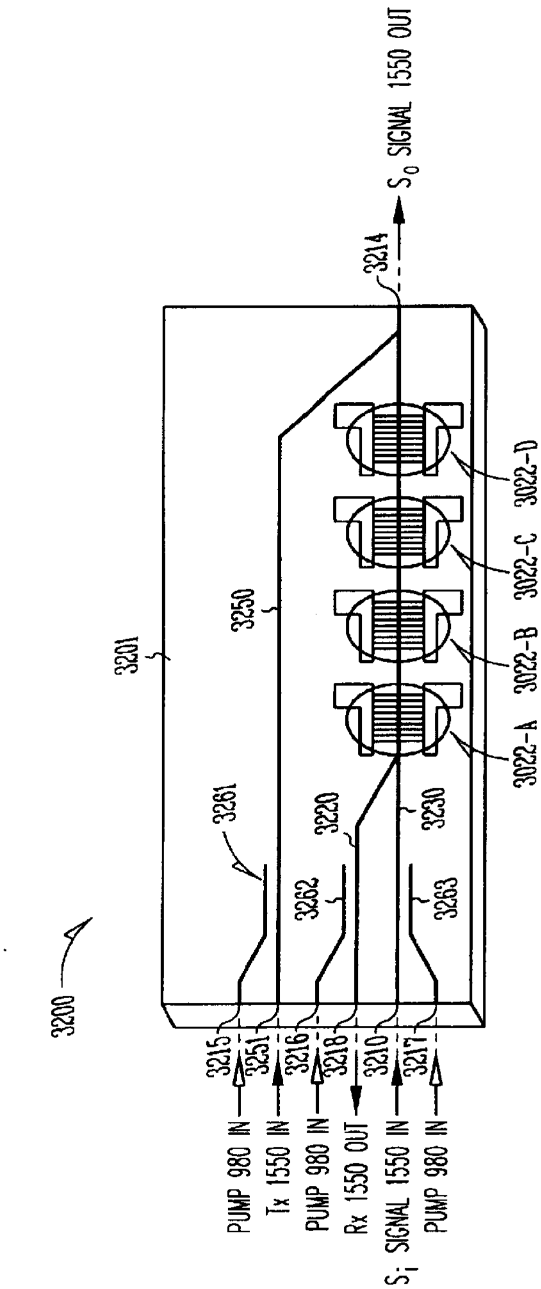
FIG. 32 shows a top view of an active waveguide device 3200 having a signal waveguide 3230 passing left to right longitudinally, reflecting some light to waveguide 3220, and the reflected light selected by wavelength-sensitive electrically controlled electro-optic grating reflectors 3022-A, 3022-B, 3022-C, and 3022-D is passed back to Rx output port 3218.

One embodiment of the invention is illustrated by FIG. 32, which shows a top view of a waveguide device 3200 having a signal waveguide 3230 passing left to right longitudinally within a heavily doped substrate 3201, wherein pump light is injected into the middle left-hand pump port 3216 (this pump light crosses to waveguide 3220 at evanescent coupler 3262) only if a received signal is desired, such that the middle waveguide 3220 passes the pump light left-to-right and the reflected light selected by wavelength-sensitive electrically controlled electro-optic grating reflectors 3022-A, 3022-B, 3022-C, and 3022-D is passed back right-to-left to Rx output port 3218. Similarly, pump light is injected into the upper left-hand pump port 3215 (this pump light crosses to waveguide 3250 at evanescent coupler 3261) only if a transmitted/added signal (from signal Tx 1550 in) is desired, such that the upper waveguide 3250 passes the pump light left-to-right and the amplified Tx 1550 in signal is passed back left-to-right as well. Similarly, pump light is injected into the lower left-hand pump port 3215 (this pump light crosses to waveguide 3230 at evanescent coupler 3263) only if an amplified input signal (from Si Signal 1550 in) is desired, such that the lower waveguide 3230 passes the pump light left-to-right and the amplified Si Signal 1550 in signal is passed back left-to-right as well.

In FIG. 32, an input signal Si is injected into port 3210. If a received signal is desired, then pump light is launched into port 3216, and the pump light is evanescently coupled into waveguide 3220 by evanescent coupler 3262, and propagates only toward the right. Depending on the amount of pump light added, pump light launched into port 3216 causes amplification in waveguide 3220 to equal or exceed the light absorption by the doping species. Further, if a signal out is desired, then pump light is launched into port 3217 and/or port 3214, and the pump light is evanescently coupled into waveguide 3230 by evanescent coupler 3263, and propagates toward the right (from port 3217) and/or left (from port 3214). In all of the above embodiments, depending on the amount of pump light added, pump light launched (e.g., into ports 3217 and/or 3214) causes amplification in waveguide 3230 to equal or exceed the light absorption by the doping species.

Figure 33:
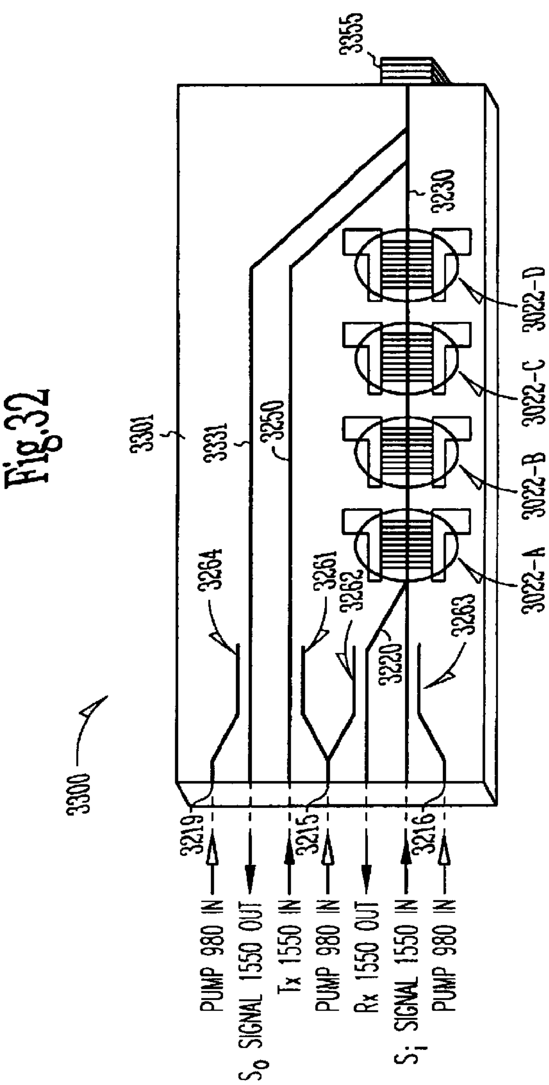
FIG. 33 shows a top perspective view (not to scale) of a waveguide device 3300.

One embodiment of the invention is illustrated by FIG. 33, which shows a top perspective view (not to scale) of a waveguide device 3300, which is similar to the embodiment of FIG. 32, except all waveguide ends interface to external optical components (e.g., optical fibers) at a single face (at the left face shown here). In this embodiment, a mirror 3355 reflects the amplified signal some of which splits off into waveguide 3331, and is amplified and output to So Signal 1550 Out only if pump light is added into port 3219 and coupled to waveguide 3331 by evanescent coupler 3264. In this embodiment, pump light added into port 3215 splits in two and is coupled to waveguide 3250 by evanescent coupler 3261 and to waveguide 3220 by evanescent coupler 3262. Since the Rx wavelength (the received "dropped" channel) is subtracted from the Si 1550 signal input, the Tx wavelength (the "added" channel) can be the same as the Rx wavelength, making this a good add-drop device.

Figure 34:
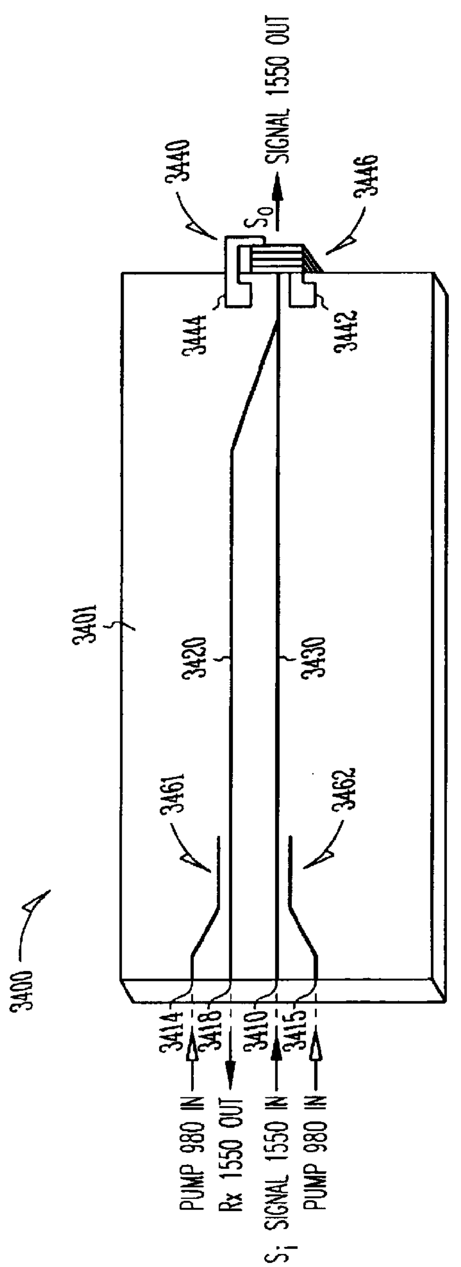
FIG. 34 shows a top perspective view (not to scale) of a waveguide device 3400.

One embodiment of the invention is illustrated by FIG. 34, which shows a top perspective view (not to scale) of a waveguide device 3400. In some embodiments, tunable reflector 3440 includes a plurality of one-quarter-wave dielectric layers 3446 and two electrodes 3442 and 3444, wherein each dielectric layer is electro-optically changeable (e.g., an applied voltage changes the index of refraction such that the wavelength that is reflected is electrically tunable) to select a specific wavelength to reflect, while not reflecting other wavelengths (i.e., one wavelength is reflected more efficiently than others are). By varying the voltage, the wavelength that is reflected is varied, thus a single wavelength channel (or a very few of the many channels) can be selected for output at Rx port 3418.

In some embodiments, the substrate 3401 is heavily doped, such that the reflected wavelength is further amplified and is output to port 3418 only if pump light is added into port 3414 and crosses to waveguide 3420 at evanescent coupler 3261. The So Signal 1550 Out is amplified and passes through wavelength tunable mirror 3440, the amplification energy provided by pump light that is added to port 3415 and that crosses to waveguide 3430 at evanescent coupler 3262. The amount of amplification depends on the amount of pump light added.

In other embodiments, the substrate 3401 is not doped (and evanescent couplers 3261 and 3462 are omitted), such that the reflected wavelength is not amplified but is always output to port 3418. The So Signal 1550 Out is also not amplified, and passes through wavelength tunable mirror 3440.

Figure 35:
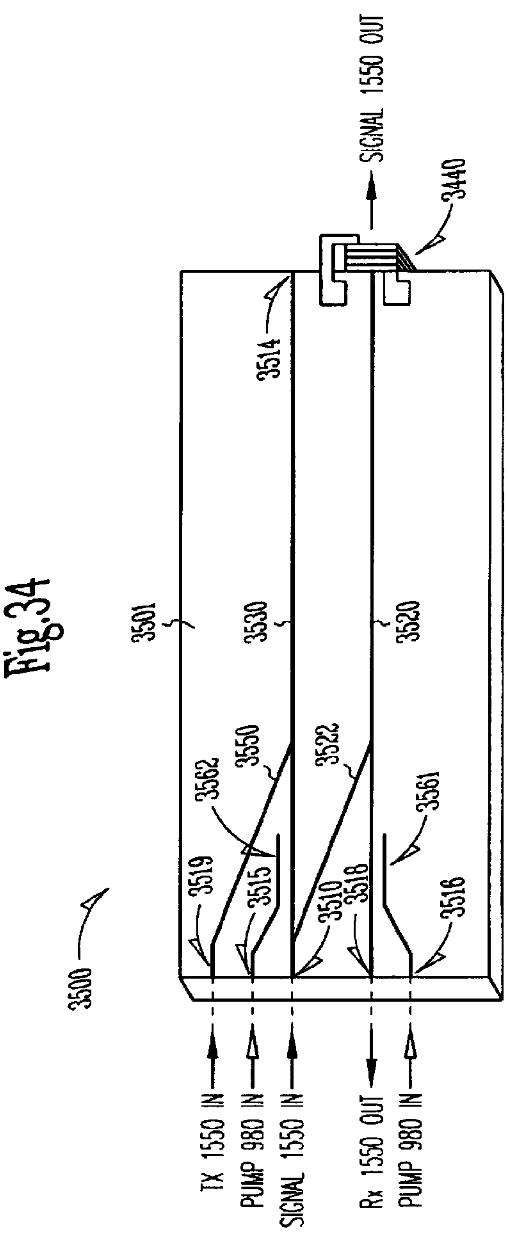
FIG. 35 shows a top perspective view (not to scale) of a waveguide device 3500.

One embodiment of the invention is illustrated by FIG. 35, which shows a top perspective view (not to scale) of a waveguide device 3500. In some embodiments, tunable reflector 3440 (as described above) is placed on Rx waveguide 3520. Some of the input light splits to crossing waveguide 3522, and is amplified by rump-light energy added at port 3516. By varying the voltage to tunable reflector 3440, the wavelength that is reflected is varied, thus a single wavelength channel (or a very few of the many channels) can be selected for output at Rx port 3518. Added signal Tx 1550 In is input to port 3519, and adds into the Si signal 1550 in waveguide 3530, and both are amplified and output through port 3514 only if pump light is added to port 3515. Since the Rx wavelength is not subtracted from the Si 1550 signal input, the Tx wavelength should be different than the Rx wavelength. In some embodiments, waveguide 3550 is made longer before it joins waveguide 3530, and an additional pump-light port is added for Tx waveguide 3550.

Figure 36:
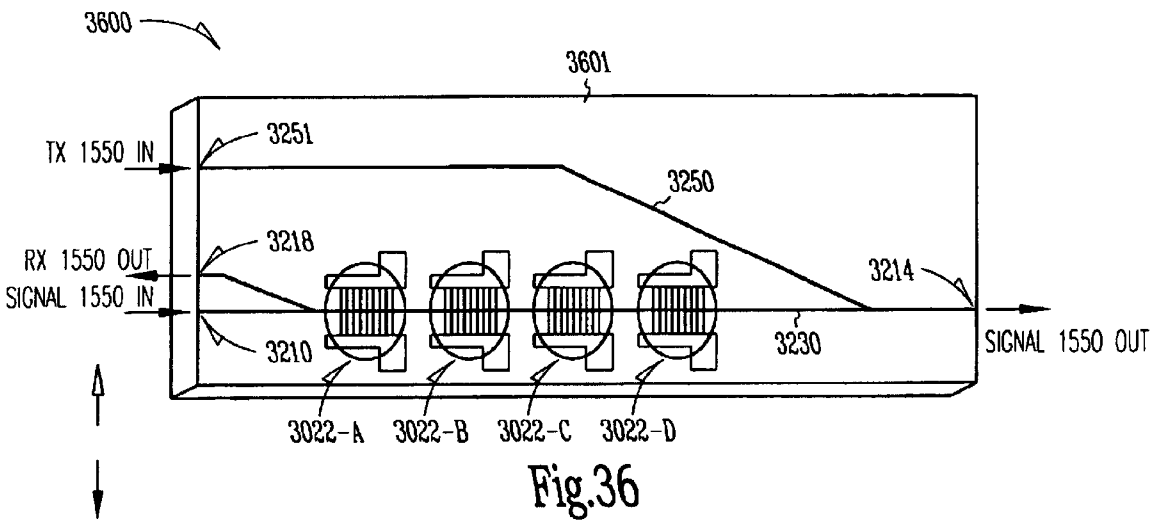
FIG. 36 shows a top perspective view (not to scale) of a waveguide device 3600.

FIG. 36 shows a top perspective view (not to scale) of a waveguide device 3600. Device 3600 is similar to device 3200 if FIG. 32, except substrate 3601 is undoped, and no amplification occurs in device 3600. Otherwise, the ports and waveguides and gratings function the same as in FIG. 32.

FIG. 37 shows a top view (not to scale) of a waveguide device wavelength-sensitive electrically controlled electro-optic grating reflector 3022.

FIG. 38 shows a side view (not to scale) of a waveguide device wavelength-sensitive electrically controlled electro-optic grating reflector 3022. FIG. 39 shows a front view (not to scale) of a waveguide device wavelength-sensitive electrically controlled electro-optic grating reflector 3022. In all three FIGS. 37–39, grating 3720 is formed, in some embodiments, in a surface layer of SiO2 deposited on phosphate-glass substrate 3001 across waveguide 3020. The ridge-to-ridge spacing 3798 and the angle 3799 between the grating lines and waveguide 3020, as well as the index of refraction of the various materials and the width (or diameter) of waveguide 3020 all interact to determine the interaction wavelength that will be reflected if the grating is "turned on." Electrodes 3742 and 3744 are used to apply a voltage to electro-optic material 3710 to change its index of refraction. When the applied voltage is such that the index of refraction of electro-optic material 3710 matches the index of refraction of grating 3720 (when measured at the wavelength of interest in waveguide 3020), the ridges effectively disappear, and the grating, being transparent has no interaction with the light in the waveguide, there is no reflection and the grating reflector 3022 is "turned off" for all wavelengths (it is substantially transparent). When the applied voltage is such that the index of refraction of electro-optic material 3710 is significantly different than the index of refraction of grating 3720 (when measured at the wavelength of interest in waveguide 3020), the ridges are effectively "seen" by the light in waveguide 3020, and the grating, (perhaps evanescently) interacting with the waveguide light, causes a reflection at the specific wavelength of the grating (as described above) and the grating reflector 3022 is "turned on" for that specific wavelength, while other wavelengths pass through.

As in each of the figures described herein, some embodiments include a ferrule that holds a plurality of optical fibers in fixed relationship to one another, such that all fibers can be simultaneously aligned to their respective input or output ports (e.g., ports 3210, 3212, 3213, 3214, 3216, and 3218). In some embodiments, a single ferrule holds optical fibers for both the left and right-side light signal connections. In other embodiments, two or more separately movable ferrules hold optical fibers for the left-side and right-side light signal connections. In some embodiments, the optical fibers are butt-joined to align to their respective waveguide ports. In other embodiments, one or more lenses are added between the end of the optical fibers and their respective input ports to focus the light from the fiber into the input ports and/or to focus the light from the output ports into the optical fibers.

Further, in some embodiments, a plurality of copies of the set of waveguides shown are implemented one set above another, in order that if one set of waveguides does not function properly, the ferrule of optical fibers can be aligned to another set of waveguides. This is because it is sometimes not practical to dice substrates so small that only a single set of waveguides fits on a substrate, thus with a given minimum-size substrate, there can be more than one set of waveguides formed, with a fewer number of sets actually connected to optical fibers, and functioning.

Conclusion:

One aspect of the present invention provides an integrated photonic apparatus that includes a glass substrate having a major surface, wherein the glass substrate includes a plurality of regions, each region having a different index of refraction, including a first region having a first index of refraction and a second region having a second index of refraction lower than the first index of refraction, and a first waveguide formed along the major surface of the substrate, wherein the first waveguide has a higher index of refraction than an intrinsic index of refraction of adjacent portions of the substrate, and wherein the first waveguide passes through the first region and through the second region of the glass substrate.

In some embodiments, the first region includes a dopant including an optically active species.

In some embodiments, the first region acts to substantially confine a pump light. In some embodiments, the higher index of refraction of the first region allows pump light to enter the first region but not escape to the second region.

In some embodiments, a pump light is introduced into the second region, the pump light enters the first region from the second region, and the first region acts to substantially confine the pump light.

In some embodiments, a pump light is introduced into the first region from a face having an area much larger than a cross-sectional area of the first waveguide, and the first region acts to substantially confine the pump light.

In some embodiments, a pump light is introduced into the first region from a first face having an area much larger than a cross-sectional area of the first waveguide, wherein the first region has a second face opposite the first face that is substantially reflective at a wavelength of the pump light, and the first region acts to substantially confine the pump light.

In some embodiments, a pump light is introduced into the first region from a first face having an area much larger than a cross-sectional area of the first waveguide, wherein the first region has a second face that is substantially reflective at a wavelength of the pump light, and the first region acts to substantially confine the pump light, and wherein a light signal is introduced into the first waveguide at a third face that is substantially perpendicular to the first face and to the second face.

In some embodiments, the first region is a base portion of the substrate, and the second region is a cladding deposited on the substrate.

In some embodiments, the first region is formed at a non-perpendicular angle to a face of the apparatus.

In some embodiments, at least a portion of a length of the waveguide is serpentine.

In some embodiments, the first region crosses a length of the substrate, and the waveguide crosses the length within the first region.

In some embodiments, the first region crosses a length of the substrate, and the waveguide crosses the length within the first region and is closer to one lateral side of the first region than to an opposing second side.

In some embodiments, the first region crosses a length of the substrate, and the waveguide crosses the length within the first region and is closer to one lateral side of the first region than to an opposing second side, wherein the second region is substantially undoped by active optical species, the first region is doped with an active optical species.

In some embodiments, the first region crosses a length of the substrate, and the waveguide crosses the length within the first region and is closer to one lateral side of the first region than to an opposing second side, wherein the second region is substantially undoped by active optical species, the first region is doped with an active optical species, and pump light is launched into the second region.

Another aspect of the present invention provides a method that includes providing a glass substrate having a major surface, forming a plurality of regions in the glass substrate, each region having a different index of refraction, including a first region having a first index of refraction and a second region having a second index of refraction lower than the first index of refraction, and forming a first waveguide along the major surface of the substrate, wherein the first waveguide has a higher index of refraction than an intrinsic index of refraction of adjacent portions of the substrate, and wherein the first waveguide passes through the first region and through the second region of the glass substrate.

In some embodiments of the method, the first region includes a dopant including an optically active species.

In some embodiments of the method, the first region acts to substantially confine a pump light.

Some embodiments of the method further include introducing pump light into the second region, the pump light entering the first region from the second region, and wherein the first region acts to substantially confine the pump light.

Some embodiments of the method further include introducing pump light into the first region from a face of the substrate having an area much larger than a cross-sectional area of the first waveguide, and wherein the first region acts to substantially confine the pump light.

Some embodiments of the method further include introducing pump light into the first region from a first face of the substrate having an area much larger than a cross-sectional area of the first waveguide, wherein the first region has a second face that is substantially reflective at a wavelength of the pump light, and the first region acts to substantially confine the pump light.

Some embodiments of the method further include introducing pump light into the first region from a first face of the substrate having an area much larger than a cross-sectional area of the first waveguide, wherein the first region has a second face that is substantially reflective at a wavelength of the pump light, and the first region acts to substantially confine the pump light, and wherein a light signal is introduced into the first waveguide at a third face that is substantially perpendicular to the first face and to the second face.

In some embodiments of the method, the first region is a base portion of the substrate, and the second region is a cladding deposited on the substrate.

In some embodiments of the method, the first region is formed at a non-perpendicular angle to a face of the apparatus.

In some embodiments of the method, at least a portion of a length of the waveguide is serpentine.

In some embodiments of the method, the first region crosses a length of the substrate, and the waveguide crosses the length within the first region.

In some embodiments of the method, the first region crosses a length of the substrate, and the waveguide crosses the length within the first region and is closer to one lateral side of the first region than to an opposing second side.

In some embodiments of the method, the first region crosses a length of the substrate, and the waveguide crosses the length within the first region and is closer to one lateral side of the first region than to an opposing second side, wherein the second region is substantially undoped by active optical species, the first region is doped with an active optical species.

In some embodiments of the method, the first region crosses a length of the substrate, and the waveguide crosses the length within the first region and is closer to one lateral side of the first region than to an opposing second side, wherein the second region is substantially undoped by active optical species, the first region is doped with an active optical species, and pump light is launched into the second region.

Yet another aspect of the present invention provides an integrated photonic apparatus that includes a glass substrate having a major surface, an input signal waveguide formed along the major surface of the substrate, an output signal waveguide formed along the major surface of the substrate, and optically coupled to the input waveguide, an input pump waveguide formed along the major surface of the substrate and optically coupled to at least one of the output waveguide and the input waveguide, and a first pump-stabilizing grating formed on the input pump waveguide, wherein the first grating is transparent a first wavelength and is dispersive to a plurality of other wavelengths, such that the first wavelength is passed to the output waveguide and the plurality of other wavelengths are attenuated.

In some embodiments, each waveguide has a higher index of refraction than an index of refraction of adjacent portions of the substrate.

Some embodiments further include an output pump waveguide, optically coupled to the input signal waveguide and to the pump waveguide, and formed along the major surface of the substrate, wherein the pump waveguide has a higher index of refraction than an index of refraction of adjacent portions of the substrate. Some such embodiments further include a second pump-stabilizing grating formed on the output pump waveguide, wherein the second grating is transparent a first wavelength and is dispersive to a plurality of other wavelengths, such that the first wavelength is passed to the output waveguide and the plurality of other wavelengths are attenuated.

Some embodiments further include a third output-flattening grating formed on the output waveguide, wherein the third output-flattening grating has a wavelength-transfer function that is complementary to a gain curve of the active species of the substrate in order to flatten a gain curve of the apparatus.

Yet another aspect of the present invention provides an integrated photonic apparatus that includes a glass substrate having a major surface, the substrate including at least a portion having one or more active optical species, an input signal waveguide formed along the major surface of the substrate, an input pump waveguide formed along the major surface of the substrate, optically coupled to transfer pump light to the input signal waveguide, and a first output-flattening grating formed on the input waveguide, wherein the first output-flattening grating has a wavelength-transfer function that is complementary to a gain curve of the active species of the substrate in order to flatten a gain curve of the apparatus.

In some embodiments, each waveguide has a higher index of refraction than an index of refraction of adjacent portions of the substrate.

Some embodiments further include an output pump waveguide, optically coupled to the input signal waveguide, and formed along the major surface of the substrate, wherein the pump waveguide has a higher index of refraction than an index of refraction of adjacent portions of the substrate. Some such embodiments further include a second pump-stabilizing grating formed on the output pump waveguide, wherein the second grating is transparent a first wavelength and is dispersive to a plurality of other wavelengths, such that the first wavelength is passed to the output waveguide and the plurality of other wavelengths are attenuated.

Some embodiments further include a third output-flattening grating formed on the output waveguide, wherein the third output-flattening grating has a wavelength-transfer function that is complementary to a gain curve of the active species of the substrate in order to flatten a gain curve of the apparatus.

Yet another aspect of the present invention provides a method for separating a wavelength from a plurality of wavelengths. This method includes providing a glass substrate having a major surface, an input signal waveguide formed along the major surface of the substrate, an output signal waveguide formed along the major surface of the substrate, and optically coupled to the input waveguide, launching pump light into at least one of the output waveguide and the input waveguide, and applying a first wavelength-sensitive transfer function to light in one of the waveguides wherein the transfer function passed a first wavelength and is dispersive to a plurality of other wavelengths, such that the first wavelength is passed to the output waveguide and the plurality of other wavelengths are attenuated.

In some embodiments of the method, each waveguide has a higher index of refraction than an index of refraction of adjacent portions of the substrate.

Some embodiments of the method further include launching pump light into both of the output waveguide and the input waveguide.

Some embodiments of the method further include applying a second wavelength-sensitive transfer function to the pump light to stabilize the pump light.

Some embodiments of the method further include applying a second wavelength-sensitive transfer function that is complementary to a gain curve of the active species of the substrate in order to flatten a gain curve.

Yet another aspect of the present invention provides a method for flatten a gain curve of a photonic device. This method includes providing a glass substrate having a major surface, an input signal waveguide formed along the major surface of the substrate, an output signal waveguide formed along the major surface of the substrate, and optically coupled to the input waveguide, launching pump light into at least one of the output waveguide and the input waveguide, and applying a first wavelength-sensitive transfer function to light in one of the waveguides that is complementary to a gain curve of the active species of the substrate in order to flatten a gain curve.

Some embodiments of this method further include applying a second wavelength-sensitive transfer function that passes a first wavelength and is dispersive to a plurality of other wavelengths, such that the first wavelength is passed to the output waveguide and the plurality of other wavelengths are attenuated.

Still another aspect of the present invention provides an integrated photonic apparatus that includes a glass substrate having a major surface, an input signal waveguide formed along the major surface of the substrate, an output signal waveguide, optically coupled to the input waveguide, and formed along the major surface of the substrate, a drop signal waveguide, optically coupled to the input waveguide, and formed along the major surface of the substrate, and a first grating formed on the output waveguide, wherein the first grating reflects a first wavelength and is transparent to a plurality of other wavelengths, such that the first wavelength is passed to the drop waveguide and the plurality of other wavelengths is passed through to an exit interface of the output waveguide.

Some embodiments further include a second grating formed on the output waveguide, wherein the first and second gratings are each electrically activatable, and wherein the first grating when activated reflects a first wavelength and is transparent to a plurality of other wavelengths including a second wavelength, wherein the second grating when activated reflects the second wavelength and is transparent to a plurality of other wavelengths including the first wavelength, such that when the first grating is activated and the second grating is deactivated the first wavelength is passed to the drop waveguide and the second wavelength is passed through to the exit interface of the output waveguide, and when the second grating is activated and the first grating is deactivated the second wavelength is passed to the drop waveguide and the first wavelength is passed through to the exit interface of the output waveguide.

Some embodiments further include an add-signal waveguide, optically coupled to the output waveguide, and formed along the major surface of the substrate, wherein the add waveguide has a higher index of refraction than an index of refraction of adjacent portions of the substrate, and wherein the first grating reflects a first wavelength and is transparent to a plurality of other wavelengths, wherein a third wavelength is launched into the add waveguide, such that the first wavelength is passed to the drop waveguide and the plurality of other wavelengths and the third wavelength are passed through to an exit interface of the output waveguide.

Some embodiments further include an add-signal waveguide, optically coupled to the output waveguide, and formed along the major surface of the substrate, wherein the add waveguide has a higher index of refraction than an index of refraction of adjacent portions of the substrate, and wherein the first grating reflects a first wavelength and is transparent to a plurality of other wavelengths, wherein a third wavelength is launched into the add waveguide, such that the first wavelength is passed to the drop waveguide and the plurality of other wavelengths and the third wavelength are passed through to an exit interface of the output waveguide.

In some embodiments, all interfaces to couple light between the substrate and external devices are formed at a single face of the substrate other than the major surface of the substrate.

In some embodiments, each waveguide has a higher index of refraction than an index of refraction of adjacent portions of the substrate.

Still yet another aspect of the present invention provides a method for separating a wavelength from a plurality of other wavelengths. This method includes providing a glass substrate having a major surface, an input signal waveguide formed along the major surface of the substrate, an output signal waveguide formed along the major surface of the substrate, and optically coupled to the input waveguide, and a drop signal waveguide, optically coupled to the input waveguide, and formed along the major surface of the substrate, launching input signal into input waveguide, adding pump light to at least one of the input waveguide and the output waveguide, receiving a drop-wavelength signal from the drop-signal waveguide, and selectably applying a first wavelength-sensitive transfer function to light in one of the waveguides that reflects a first wavelength and is transparent to a plurality of other wavelengths, such that the first wavelength is passed to the drop waveguide and the plurality of other wavelengths is passed through to an exit interface of the output waveguide.

Some embodiments of the method further include selectably applying a second wavelength-sensitive transfer function to light in one of the waveguides that reflects the second wavelength and is transparent to a plurality of other wavelengths including the first wavelength, such that when the first transfer function is activated and the second transfer function is deactivated the first wavelength is passed to the drop waveguide and the second wavelength is passed through to the exit interface of the output waveguide, and when the second transfer function is activated and the first transfer function is deactivated the second wavelength is passed to the drop waveguide and the first wavelength is passed through to the exit interface of the output waveguide.

Some embodiments of the method further include providing an add signal waveguide, optically coupled to the output waveguide, and formed along the major surface of the substrate, and launching a third wavelength into the add waveguide, wherein the first transfer function reflects a first wavelength and is transparent to a plurality of other wavelengths, such that the first wavelength is passed to the drop waveguide and the plurality of other wavelengths and the third wavelength are passed through to an exit interface of the output waveguide.

Some embodiments of the method further include coupling light between the substrate and all external devices from a single face of the substrate other than the major surface of the substrate.

Some embodiments of the method further include applying a first wavelength-sensitive transfer function to light in one of the waveguides that is complementary to a gain curve of the active species of the substrate in order to flatten a gain curve of the apparatus.

Another aspect of the present invention provides an integrated photonic apparatus, for switchably routing signal light, that includes a glass substrate having a major surface, an input signal waveguide formed along the major surface of the substrate, an output signal waveguide, optically coupled to the input waveguide, and formed along the major surface of the substrate, a drop signal waveguide, optically coupled to the input waveguide, and formed along the major surface of the substrate, and a first pump-light interface optically coupled to at least one of the input, the drop, and the output waveguides, the glass substrate having a sufficiently high doping level such that only when sufficient pump light is launched into the first pump light interface is significant light of a drop-signal wavelength is output from the drop-signal waveguide.

Some embodiments further include a first reflector formed on at least one of the input and the output waveguides, wherein the first reflector reflects a first wavelength and is transparent to a plurality of other wavelengths, such that the first wavelength is passed to the drop waveguide and the plurality of other wavelengths is passed through to an exit interface of the output waveguide.

Some embodiments further include a first electro-optic reflector formed on at least one of the input and the output waveguides, wherein the first electro-optic reflector reflects a first wavelength and is transparent to a plurality of other wavelengths such that the first wavelength is passed to the drop waveguide and the plurality of other wavelengths is passed through to an exit interface of the output waveguide when the first electro-optic reflector is turned on.

In some embodiments, the first electro-optic reflector comprises a physical grating having an electro-optic material coating that selectably matches or mismatches an index of refraction of the grating, wherein the first wavelength is reflected when the electro-optic material coating mismatches the index of refraction of the grating.

Some embodiments further include a second electro-optic reflector that comprises a physical grating having an electro-optic material coating that selectably matches or mismatches an index of refraction of the grating, wherein a wavelength selectably reflected by the first electro-optic reflector is different than a wavelength selectably reflected by the second electro-optic reflector.

In some embodiments, the first electro-optic reflector comprises a plurality of dielectric layers of an electro-optic material coating each of which selectably change an index of refraction, thus changing a wavelength that is reflected.

Some embodiments further include an add signal waveguide, optically coupled to the output waveguide, and formed along the major surface of the substrate.

Some embodiments further include a first electro-optic reflector formed on the output waveguide, wherein the first electro-optic reflector selectably reflects a first wavelength and is transparent to a plurality of other wavelengths such that the first wavelength is passed to the drop waveguide and the plurality of other wavelengths is passed through to an exit interface of the output waveguide when the first electro-optic reflector is turned on, and wherein the first pump-light interface is optically coupled to the drop waveguide, the glass substrate having a doping level such that when sufficient pump light is launched into the first pump light interface, light of the drop-signal wavelength is output from the drop-signal waveguide.

Some embodiments further include an add signal waveguide, optically coupled to the output waveguide, and formed along the major surface of the substrate, wherein the add waveguide has a higher index of refraction than an index of refraction of adjacent portions of the substrate, and a second pump-light interface optically coupled to the add waveguide, the glass substrate having a doping level such that only when sufficient pump light is launched into the second pump light interface, light of a add-signal wavelength is output from the output waveguide.

Some embodiments further include a third pump-light interface optically coupled to the output waveguide, the glass substrate having a doping level such that only when sufficient pump light is launched into the third pump light interface, light of a add-signal wavelength is output from the output waveguide.

Another aspect of the present invention provides a method that includes providing a glass substrate having a major surface, an input signal waveguide formed along the major surface of the substrate, an output signal waveguide, optically coupled to the input waveguide, and formed along the major surface of the substrate, a drop signal waveguide, optically coupled to the input waveguide, and formed along the major surface of the substrate, and launching pump-light into at least one of the input, the drop, and the output waveguides, wherein the glass substrate has a sufficiently high doping level such that only when sufficient pump light is launched into the first pump light interface is significant light of a drop-signal wavelength is output from the drop-signal waveguide.

Some embodiments of the method further include reflecting a first wavelength and not reflecting a plurality of other wavelengths, such that the first wavelength is passed to the drop waveguide and the plurality of other wavelengths is passed through to an exit interface of the output waveguide.

Some embodiments of the method further include selectably reflecting a first wavelength and not reflecting a plurality of other wavelengths, such that the first wavelength is passed to the drop waveguide and the plurality of other wavelengths is passed through to an exit interface of the output waveguide. In some such embodiments, the selectably reflecting comprises providing a physical grating having an electro-optic material coating that selectably matches or mismatches an index of refraction of the grating, wherein the first wavelength is reflected when the electro-optic material coating mismatches the index of refraction of the grating. In some such embodiments, the selectably reflecting comprises selectably reflecting either one or another of at least two different wavelengths.

In some embodiments, the selectably reflecting comprises changing an index of refraction of a plurality of dielectric layers of an electro-optic material coating, thus changing a wavelength that is reflected.

Some embodiments of the method further include providing an add signal waveguide, optically coupled to the output waveguide, and formed along the major surface of the substrate, and launching a second wavelength of light into the add-signal waveguide.

Some embodiments of the method further include selectably reflecting a first wavelength and passing a plurality of other wavelengths such that the first wavelength is passed to the drop waveguide and the plurality of other wavelengths is passed through to an exit interface of the output waveguide, and launching pump-light into the drop waveguide, the glass substrate having a doping level such that when sufficient pump light is launched into the drop waveguide, light of the first wavelength is output from the drop-signal waveguide.

Some embodiments of the method further include providing an add signal waveguide, optically coupled to the output waveguide, and formed along the major surface of the substrate, and launching pump-light into the add waveguide, the glass substrate having a doping level such that only when sufficient pump light is launched into the add signal waveguide, light of a add-signal wavelength is output from the output waveguide.

The invention thus provides means for controlling an amount of light of a drop-signal wavelength that is output from the drop-signal waveguide.

Another aspect of the present invention provides an integrated photonic apparatus that includes a glass substrate having a major surface, wherein the glass substrate includes a plurality of regions, each region having a different index of refraction, including a first region having a first index of refraction and a second region having a second index of refraction lower than the first index of refraction, the first region forming a first waveguide for constraining a pump light, and a second waveguide formed along the major surface of the substrate, wherein the second waveguide has a higher index of refraction than an intrinsic index of refraction of adjacent portions of the substrate, and wherein the second waveguide passes through the first region and through the second region of the glass substrate, and wherein the pump light enters the second waveguide along its side in the first waveguide. See, for example, FIGS. 11 and 12.

Another aspect of the present invention provides apparatus and methods for stabilizing and/or flattening gain curves. For example, a tuned grating to stabilize the input pump laser light, to flatten output gain curve, or both.

One embodiment includes an integrated photonic apparatus that has a glass substrate having a major surface, an input signal waveguide formed along the major surface of the substrate, wherein the input signal waveguide has a higher index of refraction than an index of refraction of adjacent portions of the substrate, an input pump waveguide formed along the major surface of the substrate, wherein the pump waveguide has a higher index of refraction than an index of refraction of adjacent portions of the substrate, an output pump waveguide, optically coupled to the input signal waveguide and to the pump waveguide, and formed along the major surface of the substrate, wherein the pump waveguide has a higher index of refraction than an index of refraction of adjacent portions of the substrate, and a first pump-stabilizing grating formed on the pump waveguide, wherein the first grating is transparent a first wavelength and is dispersive to a plurality of other wavelengths, such that the first wavelength is passed to the output waveguide and the plurality of other wavelengths are attenuated.

Yet another aspect of the present invention provides an integrated photonic apparatus including a glass substrate having a major surface, the substrate including at least a portion having one or more active optical species, an input signal waveguide formed along the major surface of the substrate, wherein the input signal waveguide has a higher index of refraction than an index of refraction of adjacent portions of the substrate, an input pump waveguide formed along the major surface of the substrate, wherein the pump waveguide has a higher index of refraction than an index of refraction of adjacent portions of the substrate, an output pump waveguide, optically coupled to the input signal waveguide and to the pump waveguide, and formed along the major surface of the substrate, wherein the pump waveguide has a higher index of refraction than an index of refraction of adjacent portions of the substrate, and a first output-flattening grating formed on the output waveguide, wherein the first output-flattening grating has a wavelength-transfer function that is complementary to a gain curve of the active species of the substrate in order to flatten a gain curve of the apparatus.

The present invention also provides apparatus and methods for adding and/or dropping one or more optical wavelengths from a light signal having a plurality of wavelengths. For example, selectable gratings to get a tunable/selectable drop (peel-off) wavelength, an add waveguide that is run in an undoped region running parallel to the active drop section, and/or an add/drop peel-off section surrounded with a confined active region. Some embodiments selectively pump waveguides in a lossy gain region to activate add/drop attenuation/amplification functions, such that specific waveguides are activated. In some such embodiments, this is combined with an undoped region fused to active region, wherein pump light is launched into undoped waveguides that route activation light to selected doped waveguides.

Some embodiments include an integrated photonic apparatus that has a glass substrate having a major surface, an input signal waveguide formed along the major surface of the substrate, wherein the input waveguide has a higher index of refraction than an index of refraction of adjacent portions of the substrate, an output signal waveguide, optically coupled to the input waveguide, and formed along the major surface of the substrate, wherein the output waveguide has a higher index of refraction than an index of refraction of adjacent portions of the substrate, a drop signal waveguide, optically coupled to the input waveguide, and formed along the major surface of the substrate, wherein the drop waveguide has a higher index of refraction than an index of refraction of adjacent portions of the substrate, and a first grating formed on the output waveguide, wherein the first grating reflects a first wavelength and is transparent to a plurality of other wavelengths, such that the first wavelength is passed to the drop waveguide and the plurality of other wavelengths is passed through to an exit interface of the output waveguide.

Some such embodiments further include a second grating formed on the output waveguide, wherein the first and second gratings are electrically activatable, and wherein the first grating when activated reflects a first wavelength and is transparent to a plurality of other wavelengths including a second wavelength, wherein the second grating when activated reflects the second wavelength and is transparent to a plurality of other wavelengths including the first wavelength, such that when the first grating is activated and the second grating is deactivated the first wavelength is passed to the drop waveguide and the second wavelength is passed through to the exit interface of the output waveguide, and when the second grating is activated and the first grating is deactivated the second wavelength is passed to the drop waveguide and the first wavelength is passed through to the exit interface of the output waveguide.

Some embodiments further include an add signal waveguide, optically coupled to the output waveguide, and formed along the major surface of the substrate, wherein the add waveguide has a higher index of refraction than an index of refraction of adjacent portions of the substrate, and wherein the first grating reflects a first wavelength and is transparent to a plurality of other wavelengths, wherein a third wavelength is launched into the add waveguide, such that the first wavelength is passed to the drop waveguide and the plurality of other wavelengths and the third wavelength are passed through to an exit interface of the output waveguide.

Some embodiments further include an add signal waveguide, optically coupled to the output waveguide, and formed along the major surface of the substrate, wherein the add waveguide has a higher index of refraction than an index of refraction of adjacent portions of the substrate, and wherein the first grating reflects a first wavelength and is transparent to a plurality of other wavelengths, wherein a third wavelength is launched into the add waveguide, such that the first wavelength is passed to the drop waveguide and the plurality of other wavelengths and the third wavelength are passed through to an exit interface of the output waveguide.

Thus, the present invention as described in FIGS. 1–13 provides 1. an active region as high-n waveguide transverse to signal waveguide with one or more low-n undoped side regions
2. pump launching regions as undoped low-n region(s) welded to sides (as opposed to cladding described earlier) of narrow high-n doped region(s)
   a. lengthwise
   b. sideways
   c. one-side
   d. two-sided
3. low-index-of-refraction overcladding to optically join the separate undoped low-n side regions
4. a diagonal doped region, pump into the now larger undoped faces
5. a serpentine waveguide for lengthening gain region
6. a lengthwise doped region, waveguide along its length, optionally offset to an edge to be closer to pump light in undoped side region
7. a tapered/constricted pump waveguide within larger overcladding The present invention as described in FIGS. 14–17 additionally provides 8. tuned grating to stabilize input pump, flatten output gain curve, or both
9. selectable gratings to get tunable/selectable drop (peel-off) wavelength The present invention as described in FIGS. 18–20 additionally provides 10. run add waveguide in undoped region running parallel to active drop section
11. surround add/drop peel-off section with confined active region
12. selectively pump waveguides in a lossy gain region to activate add/drop attenuation/amplification functions, specific waveguides activated
13. combine 12. with an undoped region fused to active region, launch pump light into undoped waveguides that route activation light to selected doped waveguides The present invention as described in FIGS. 21–39 additionally provides 14. a highly doped substrate that intrinsically attenuates signal in waveguides, but which includes on or more pump ports to allow adding enough pump light to selectably overcome the attenuation and to amplify selectable wavelengths, and to route different wavelengths to different output ports.

The present invention also provides combinations of any two or more of the above features.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An integrated photonic apparatus comprising:

a glass substrate having a major surface;

a glass overcladding on the major surface of the substrate, wherein the glass overcladding includes a plurality of regions, each region having a different index of refraction, including a first region having a first index of refraction and a second region having a second index of refraction lower than the first index of refraction;

a first waveguide formed along the major surface of the substrate, wherein the first waveguide has a higher index of refraction than an intrinsic index of refraction of adjacent portions of the substrate and the overcladding, and wherein the first waveguide has an edge along at least a portion of the first region of the glass substrate overcladding; and wherein the first region is positioned to substantially confine a pump light.

2. The apparatus of claim 1, wherein the first region includes a dopant including an optically active species.

3. The apparatus of claim 1, wherein the first region acts to substantially confine a pump light.

4. The apparatus of claim 1, wherein a pump light is introduced into the second region, the pump light eaters the first region from the second region, and the first region acts to substantially confine the pump light.

5. The apparatus of claim 1, wherein the pump light is introduced into the first region from a face having an area much larger than a cross-sectional area of the first waveguide, and the first region acts to substantially confine the pump light.

6. The apparatus of claim 1, wherein a pump light is introduced into the first region from a first face having an area much larger than a cross-sectional area of the first waveguide, wherein the first region has a second face that is substantially reflective at a wavelength of the pump light, and the first region acts to substantially confine the pump light, and wherein a light signal is introduced into the first waveguide at a third face that is substantially perpendicular to the first face and to the second face.

7. The apparatus of claim 1, wherein the first region is a base portion of the substrate, and the second region is a cladding deposited on the substrate.

8. The apparatus of claim 1, wherein the first region is formed at a non-perpendicular angle to a face of the apparatus.

9. The apparatus of claim 1, wherein at least a portion of a length of the waveguide is serpentine.

10. The apparatus of claim 1, wherein the first region crosses a length of the substrate, and the waveguide crosses the length within the first region.

11. The apparatus of claim 1, wherein the first region crosses a length of the substrate, and the waveguide crosses the length within the first region and is closer to one lateral side of the first region than to an opposing second side.

12. The apparatus of claim 1, wherein the first region crosses a length of the substrate, and the waveguide crosses the length within the first region and is closer to one lateral side of the first region than to an opposing second side, wherein the second region is substantially undoped by active optical species, the first region is doped with an active optical species.

13. The apparatus of claim 1, wherein the first region crosses a length of the substrate, and the waveguide crosses the length within the first region and is closer to one lateral side of the first region than to an opposing second side, wherein the second region is substantially undoped by active optical species, the first region is doped with an active optical species, and pump light is launched into the second region.

14. The apparatus of claim 1, wherein the first waveguide has an edge along at least a portion of the first region of the glass overcladding to multiplex a wavelength of the pump light from the first region into the first waveguide.

15. The apparatus of claim 14, wherein:

a cross-sectional area of the first waveguide is positioned to receive a signal wavelength; and the wavelength of the pump light is to be multiplexed with the signal wavelength.

16. The apparatus of claim 1, wherein the pump light is introduced into the first region from a first face having an area much larger than a cross-sectional area of the first waveguide, wherein the first region has a second face that is substantially reflective at a wavelength of the pump light, and the first region acts to substantially confine the pump light.

17. An integrated photonic apparatus comprising:

a glass substrate having a major surface;

a glass overcladding on the major surface of the substrate, wherein the glass overcladding includes a plurality of regions, each region having a different index of refraction, including a first region having a first index of refraction and a second region having a second index of refraction lower than the first index of refraction, wherein the fist, region includes a dopant including an optically active species;

a first waveguide formed along the major surface of the substrate wherein the first waveguide has a higher index of refraction than an intrinsic index of refraction of adjacent portions of the substrate and the overcladding, and wherein the first waveguide has an edge along at least a portion of the first region of the glass overcladding; and wherein a pump light is introduced into the first region from a first face having an area much larger than a cross-sectional area of the first waveguide, wherein the first region has a second face that is substantially reflective at a wavelength of the pump light, and the first region acts to substantially confine the pump light.

18. The apparatus of claim 17, wherein the first waveguide has an edge along at least a portion of the first region of the glass overcladding to multiplex the wavelength of the pump light from the first region into the first waveguide.

19. The apparatus of claim 18, wherein the cross-sectional area of the first waveguide is positioned to receive a signal wavelength; and the wavelength of the pump light is to be multiplexed with the signal wavelength.

20. A method comprising:

providing a glass substrate having a major surface;

forming a plurality of regions on the glass substrate, each region having a different index of refraction, including a first region having a first index of refraction and a second region having a second index of refraction lower than the first index of refraction, wherein the first region acts to substantially confine a pump light; and forming a first waveguide along the major surface of the substrate, wherein the first waveguide has a higher index of refraction than an intrinsic index of refraction of adjacent portions of the substrate, and wherein the first waveguide passes along at least a portion of the first region.

21. The method of claim 20, wherein the first region includes a dopant including an optically active species.

22. The method of claim 20, further comprising:

introducing pump light into the second region, the pump light entering the first region from the second region, and wherein the first region acts to substantially confine the pump light.

23. The method of claim 20, further comprising:

introducing pump light into the first region from a face of the substrate having an area much larger than a cross-sectional area of the first waveguide.

24. The method of claim 20, further comprising:

introducing pump light into the first region from a first face of the substrate having an area much larger than a cross-sectional area of the first waveguide, wherein the first region has a second face that is substantially reflective at a wavelength of the pump light.

25. The method of claim 20, further comprising:

introducing pump light into the first region from a first face of the substrate having an area much larger than a cross-sectional area of the first waveguide, wherein the first region has a second face that is substantially reflective at a wavelength of the pump light, and the first region acts to substantially confine the pump light, and wherein a light signal is introduced into the first waveguide at a third face that is substantially perpendicular to the first face and to the second face.

26. The method of claim 20, wherein the first region is a base portion of the substrate, and the second region is a cladding deposited on the substrate.

27. The method of claim 20, wherein the first region is formed at a non-perpendicular angle to a face of the apparatus.

28. The method of claim 20, wherein at least a portion of a length of the waveguide is serpentine.

29. The method of claim 20, wherein the first region crosses a length of the substrate, and the waveguide crosses the length within the first region.

30. The method of claim 20, wherein the first region crosses a length of the substrate, and the waveguide crosses the length within the first region and is closer to one lateral side of the first region than to an opposing second side.

31. The method of claim 20, wherein the first region crosses a length of the substrate, and the waveguide crosses the length within the first region and is closer to one lateral side of the first region than to an opposing second side, wherein the second region is substantially undoped by active optical species, the first region is doped with an active optical species.

32. The method of claim 20, wherein the first region crosses a length of the substrate, and the waveguide crosses the length within die first region and is closer to one lateral side of the first region than to an opposing second side, wherein the second region is substantially undoped by active optical species, the first region is doped with an active optical species, and pump light is launched into the second region.

33. The method of claim 20, further comprising multiplexing a wavelength of the pump light from the first region into the first waveguide.

34. The method of claim 33, further comprising:

receiving a signal wavelength in a cross-sectional area of the first waveguide; and multiplexing the wavelength of the pump light with the signal wavelength.

* * * * *

UNITED STATES PATENT AND TRADEMARK OFFICE

CERTIFICATE OF CORRECTION

PATENT NO. : 6,954,564 B2 Page 1 of 1
DATED : October 11, 2005
INVENTOR(S) : Bendett It is certified that error appears in the above-identified patent and that said Letters Patent is hereby corrected as shown below:

Column 30,
Line 61, after “glass” delete “substrate”.

Column 31,
Line 2, delete “eaters” and insert -- enters --.

Column 32,
Line 5, delete “fist,” and insert -- first --.
Line 8, after “substrate” insert -- , --.
Line 25, after “wherein” insert -- : --.
Lines 54 and 58, after “introducing” insert -- the --.

Column 34,
Line 7, delete “die” and insert -- the --.

Signed and Sealed this

Seventh Day of February, 2006

JON W. DUDAS
*Director of the United States Patent and Trademark Office*